United States Patent
Mori et al.

(10) Patent No.: US 10,448,208 B2
(45) Date of Patent: *Oct. 15, 2019

(54) APPARATUSES, METHODS, AND PROGRAMS FOR CONTROLLING GROUPING OF WIRELESS COMMUNICATION APPARATUSES

(71) Applicant: Sony Corporation, Tokyo (JP)

(72) Inventors: Masahito Mori, Kanagawa (JP); Tomoya Yamaura, Tokyo (JP); Masanori Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/100,856

(22) Filed: Aug. 10, 2018

(65) Prior Publication Data

US 2019/0007796 A1    Jan. 3, 2019

Related U.S. Application Data

(63) Continuation of application No. 15/314,220, filed as application No. PCT/JP2015/002427 on May 13, 2015, now Pat. No. 10,070,257.

(30) Foreign Application Priority Data

Jun. 6, 2014  (JP) ................. 2014-117388
Apr. 9, 2015  (JP) ................. 2015-079688

(51) Int. Cl.
*H04W 4/02* (2018.01)
*H04W 4/08* (2009.01)
*H04W 8/18* (2009.01)

(52) U.S. Cl.
CPC ............. *H04W 4/023* (2013.01); *H04W 4/08* (2013.01); *H04W 8/186* (2013.01)

(58) Field of Classification Search
CPC .......... H01L 27/115; H01L 27/11519; H04W 4/023; H04W 4/08; H04W 8/186
(Continued)

(56) References Cited

U.S. PATENT DOCUMENTS 7,873,015 B2    1/2011   Gallagher et al.
8,340,710 B2 *  12/2012  Gupta ................. H04L 29/1216
                                                         370/338
(Continued)

FOREIGN PATENT DOCUMENTS

JP    2003-258813 A    9/2003
JP    2004-166247 A    6/2004
(Continued)

OTHER PUBLICATIONS

Japanese Office Action dated Nov. 27, 2018 in connection with Japanese Application No. 2015-079688, and English translation thereof.

(Continued)

*Primary Examiner* — Tan H Trinh
(74) *Attorney, Agent, or Firm* — Wolf, Greenfield & Sacks, P.C.

(57) ABSTRACT

In some embodiments, an information processing apparatus is configured to communicate with a first wireless communication apparatus via a first communication system, the information processing apparatus comprising control circuitry configured to: receive information relating to a second communication system discovered by the first wireless communication apparatus, the second communication system being different from the first communication system; and use the information relating to the second communication system to control grouping of a plurality of wireless communication apparatuses each configured to wirelessly communicate with the information processing apparatus using the
(Continued)

first communication system, wherein the plurality of wireless communication apparatuses comprises the first wireless communication apparatus.

20 Claims, 20 Drawing Sheets

(58) Field of Classification Search
USPC ........ 455/41.1, 41.2, 522, 67.11, 552.1, 442, 455/436, 414, 519, 435.1; 370/328, 238, 370/311
See application file for complete search history.

(56) References Cited

U.S. PATENT DOCUMENTS

| | | | |
|---|---|---|---|
| 8,977,310 B2* | 3/2015 | Logalbo | H04W 8/186 455/518 |
| 9,465,377 B2 | 10/2016 | Davis et al. | |
| 9,661,058 B2* | 5/2017 | Kim | H04L 67/02 |
| 9,826,406 B2 | 11/2017 | Naito et al. | |
| 10,070,257 B2* | 9/2018 | Mori | H04W 8/186 |
| 2003/0162531 A1 | 8/2003 | Yahiro | |
| 2004/0071128 A1* | 4/2004 | Jang | H04W 88/04 370/349 |
| 2005/0078633 A1* | 4/2005 | Watanabe | H04L 12/5692 370/331 |
| 2005/0113123 A1* | 5/2005 | Torvinen | H04W 4/021 455/519 |
| 2007/0293210 A1* | 12/2007 | Strub | H04L 63/08 455/420 |
| 2008/0146223 A1* | 6/2008 | Welnick | H04W 48/18 455/434 |
| 2009/0005042 A1* | 1/2009 | Bi | H04W 48/10 455/436 |
| 2009/0217120 A1* | 8/2009 | Sawahashi | H04L 1/0003 714/750 |
| 2010/0075605 A1* | 3/2010 | Yoneda | H04M 1/7253 455/41.3 |
| 2011/0038299 A1* | 2/2011 | Sugawara | H04L 12/189 370/312 |
| 2011/0143756 A1 | 6/2011 | Gallagher et al. | |
| 2011/0182243 A1 | 7/2011 | Gallagher et al. | |
| 2012/0218918 A1 | 8/2012 | Takae et al. | |
| 2013/0090113 A1 | 4/2013 | Persson et al. | |
| 2013/0132854 A1 | 5/2013 | Raleigh et al. | |
| 2013/0276017 A1* | 10/2013 | Walker | H04N 21/44204 725/25 |
| 2013/0297690 A1 | 11/2013 | Lucero et al. | |
| 2014/0031074 A1* | 1/2014 | Sato | H04L 63/083 455/519 |
| 2014/0045466 A1* | 2/2014 | Naito | H04W 4/70 455/411 |
| 2014/0113674 A1 | 4/2014 | Joseph et al. | |
| 2014/0171077 A1* | 6/2014 | Itoh | H04W 48/18 455/435.1 |
| 2014/0171080 A1 | 6/2014 | Takae et al. | |
| 2014/0194119 A1 | 7/2014 | Sato | |
| 2014/0196116 A1* | 7/2014 | Maguire | H04L 51/32 726/4 |
| 2014/0204814 A1* | 7/2014 | Ahmadvand | H04W 52/02 370/311 |
| 2014/0206322 A1* | 7/2014 | Dimou | H04W 76/14 455/414.1 |
| 2014/0256348 A1* | 9/2014 | Wirola | H04W 64/00 455/456.1 |
| 2014/0286212 A1 | 9/2014 | Ishimura | |
| 2015/0029854 A1 | 1/2015 | Starsinic et al. | |
| 2015/0061829 A1 | 3/2015 | Williams et al. | |
| 2015/0134833 A1* | 5/2015 | Kim | H04L 67/02 709/227 |
| 2015/0244496 A1* | 8/2015 | Goto | G06F 11/10 714/776 |
| 2015/0327328 A1 | 11/2015 | Novak et al. | |
| 2015/0351022 A1 | 12/2015 | Sakoda et al. | |
| 2015/0382436 A1* | 12/2015 | Kelly | G08C 17/02 315/131 |
| 2016/0007138 A1 | 1/2016 | Palanisamy et al. | |
| 2016/0112879 A1* | 4/2016 | Horneman | H04W 16/14 455/454 |
| 2016/0198364 A1* | 7/2016 | Schwarzbauer | H04W 28/08 370/331 |
| 2016/0242046 A1* | 8/2016 | Smith | H04M 15/60 |
| 2016/0255473 A1* | 9/2016 | Abraham | H04W 4/023 370/328 |
| 2016/0323916 A1 | 11/2016 | Lee et al. | |
| 2016/0337457 A1 | 11/2016 | Kim et al. | |
| 2016/0338125 A1 | 11/2016 | Kim et al. | |
| 2016/0344593 A1* | 11/2016 | Ha | H04W 4/70 |
| 2016/0353360 A1* | 12/2016 | Lee | H04W 48/16 |
| 2017/0048671 A1* | 2/2017 | Marri Sridhar | H04L 5/0055 |
| 2017/0055311 A1* | 2/2017 | Van Phan | H04W 76/23 |
| 2017/0070866 A1* | 3/2017 | Sato | H04L 12/1868 |
| 2017/0078107 A1* | 3/2017 | Itagaki | H04W 76/14 |
| 2017/0111085 A1 | 4/2017 | Pera et al. | |
| 2017/0195838 A1 | 7/2017 | Mori et al. | |
| 2018/0176987 A1* | 6/2018 | Oda | H04L 12/66 |

FOREIGN PATENT DOCUMENTS

| | | |
|---|---|---|
| JP | 2007-096838 A | 4/2007 |
| JP | 2009-207147 A | 9/2009 |
| JP | 2012-239056 A | 12/2012 |
| JP | 2014-517552 A | 7/2014 |
| WO | WO 2012/046512 A1 | 4/2012 |
| WO | WO 2012/126514 A1 | 9/2012 |
| WO | WO 2012/135392 A1 | 10/2012 |

OTHER PUBLICATIONS

Japanese Office Action dated Jun. 18, 2019 in connection with Japanese Application No. 2015-079688, and English translation thereof.

* cited by examiner

| COMMUNICATION SYSTEM ID | TRANSMITTER UNIQUE IDENTIFIER | SIGNAL INTENSITY | ESTIMATED DISTANCE TO TRANSMITTER | TRANSMITTER DISCOVERY TIME | FIXATION | ABSOLUTE POSITIONAL INFORMATION |
|---|---|---|---|---|---|---|
| 1 | xx-xx-xx-xx-xx-xx | −20(dBm) | 3(m) | 2014/04/01 00:00:00 | YES | LATITUDE ○○ LONGITUDE △△ ALTITUDE □□ |
| 1 | yy-yy-yy-yy-yy-yy | −25(dBm) | 4(m) | 2014/04/01 00:00:02 | NO | LATITUDE ○○ LONGITUDE △△ ALTITUDE □□ |
| ... | ... | ... | ... | ... | ... | ... |

| COMMUNICATION SYSTEM ID | TRANSMITTER UNIQUE IDENTIFIER | ANOTHER COMMUNICATION SYSTEM ID | UNIQUE IDENTIFIER OF ANOTHER COMMUNICATION SYSTEM |
|---|---|---|---|
| 1 | xx-xx-xx-xx-xx-xx | 2 | zz-zz-zz-zz-zz-zz |
| 1 | yy-yy-yy-yy-yy-yy | 3 | ww-ww-ww-ww-ww-ww |
| ⋮ | ⋮ | ⋮ | ⋮ |

FIG. 10

| UNIQUE IDENTIFIER OF WIRELESS COMMUNICATION APPARATUS (UNIQUE IDENTIFIER ASSIGNED BY FIRST COMMUNICATION SYSTEM) 131 | COMMUNICATION SYSTEM ID OF DISCOVERED TRANSMITTER 132 | UNIQUE IDENTIFIER OF DISCOVERED TRANSMITTER 133 | SIGNAL INTENSITY 134 | ESTIMATED DISTANCE TO TRANSMITTER 135 | TRANSMITTER DISCOVERY TIME 136 |
|---|---|---|---|---|---|
| ss-ss-ss-ss-ss-ss | 1 | xx-xx-xx-xx-xx-xx | −20(dBm) | 3(m) | 2014/04/01 00:00:00 |
| ss-ss-ss-ss-ss-ss | 1 | yy-yy-yy-yy-yy-yy | −25(dBm) | 4(m) | 2014/04/01 00:00:02 |
| zz-zz-zz-zz-zz-zz | 1 | xx-xx-xx-xx-xx-xx | −22(dBm) | 3.5(m) | 2014/04/01 00:00:03 |
| ... | ... | ... | ... | ... | ... |

| UNIQUE IDENTIFIER OF WIRELESS COMMUNICATION APPARATUS (UNIQUE IDENTIFIER ASSIGNED BY FIRST COMMUNICATION SYSTEM) | GROUP IDENTIFIER | GROUP PARTICIPATION DATE | REPRESENTATIVE TERMINAL |
|---|---|---|---|
| ss-ss-ss-ss-ss-ss | G001 | 2014/04/01 00:00:03 | YES |
| tt-tt-tt-tt-tt-tt | G001 | 2014/04/01 00:00:03 | NO |
| zz-zz-zz-zz-zz-zz | G001 | 2014/04/01 00:00:03 | NO |
| tt-tt-tt-tt-tt-tt | G002 | 2014/04/01 00:00:07 | YES |
| ⋮ | ⋮ | ⋮ | ⋮ |

FIG. 15

| | | 100 | 211 | 212 | 213 | 214 | 215 | 216 | 221 | 222 | 201 | 202 | 203 | 204 | 205 |
|---|---|---|---|---|---|---|---|---|---|---|---|---|---|---|---|
| | | | DEVICES NOT CORRESPONDING TO FIRST COMMUNICATION SYSTEM | | | | | | | | DEVICES CORRESPONDING TO FIRST COMMUNICATION SYSTEM | | | | |
| RECEIVING SIDE | 201 | ○ | ○ | ○ | ○ | △ | △ | × | × | × | — | △ | × | × | × |
| | 202 | ○ | △ | △ | △ | ○ | ○ | ○ | ○ | ○ | △ | — | ○ | ○ | △ |
| | 203 | ○ | △ | × | × | ○ | ○ | × | ○ | × | × | ○ | — | ○ | × |
| | 204 | ○ | × | × | × | ○ | ○ | ○ | ○ | ○ | × | ○ | ○ | — | △ |
| | 205 | ○ | × | × | × | × | × | △ | × | △ | × | △ | × | △ | — |

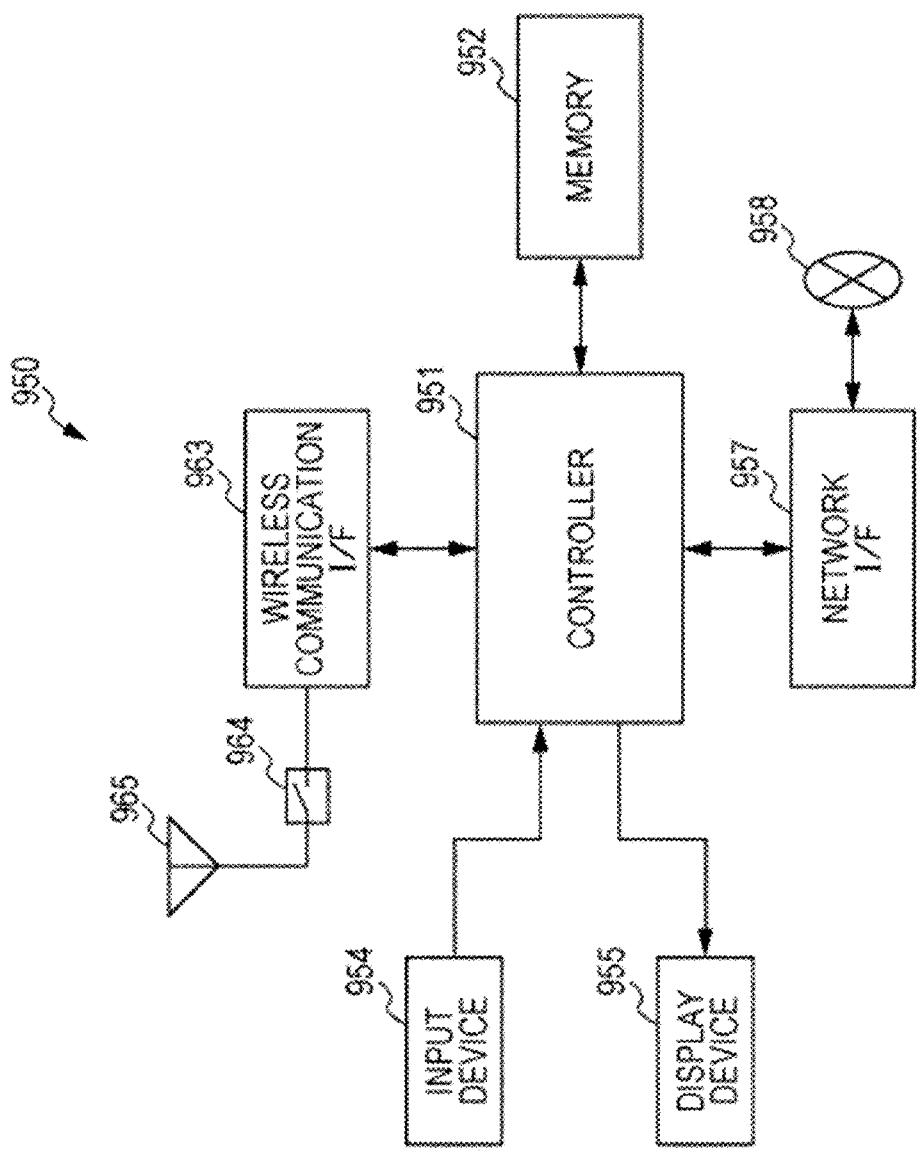

APPARATUSES, METHODS, AND PROGRAMS FOR CONTROLLING GROUPING OF WIRELESS COMMUNICATION APPARATUSES

CROSS REFERENCE TO RELATED APPLICATIONS

This Application is a Continuation of U.S. application Ser. No. 15/314,220, filed Nov. 28, 2016, entitled "APPARATUSES, METHODS, AND PROGRAMS FOR CONTROLLING GROUPING OF WIRELESS COMMUNICATION APPARATUSES", now U.S. Pat. No. 10,070,257, which is a national stage filing under 35 U.S.C. 371 of International Patent Application Serial No. PCT/JP2015/002427, filed May 13, 2015. Foreign priority benefits are claimed under 35 U.S.C. § 119(a)-(d) or 35 U.S.C. § 365(b) of Japanese application number 2015-079688, filed Apr. 9, 2015 and Japanese application number 2014-117388, filed Jun. 6, 2014. The entire contents of these applications are incorporated herein by reference in their entirety.

TECHNICAL FIELD

The present technology relates to an information processing apparatus. Particularly, the present technology relates to an information processing apparatus and an information processing method for information exchange using wireless communication, and a program configured to cause a computer to perform the method.

BACKGROUND ART

There has been a wireless communication technology which uses wireless communication to exchange information. For example, there has been multicast transmission with which one packet transmitted by a transmission terminal is received by a plurality of receiving terminals.

For example, a multicast data retransmission method has been proposed which groups mobile terminals using distances to the mobile terminals and signal intensity information from the mobile terminals (e.g., see PTL 1).

CITATION LIST

Patent Literature

[PTL 1]
JP 2004-166247 A

SUMMARY

Technical Problem

In the related art having been described above, the mobile terminals are grouped and retransmission is performed for the grouped mobile terminals.

Here, for example, it is also assumed that a plurality of wireless communication apparatuses has an obstruction between some of the wireless communication apparatuses. Even in such a case, it is important to appropriately group the plurality of wireless communication apparatuses.

The present technology has been made in view of such circumstances, and it is desirable to appropriately group a plurality of wireless communication apparatuses.

Solution to Problem

In some embodiments, an information processing apparatus is configured to communicate with a first wireless communication apparatus via a first communication system, the information processing apparatus comprising control circuitry configured to: receive information relating to a second communication system discovered by the first wireless communication apparatus, the second communication system being different from the first communication system; use the information relating to the second communication system to control grouping of a plurality of wireless communication apparatuses each configured to wirelessly communicate with the information processing apparatus using the first communication system, wherein the plurality of wireless communication apparatuses comprises the first wireless communication apparatus, and wherein controlling grouping of the plurality of wireless communication apparatuses comprises associating the first wireless communication apparatus with one or more second wireless communication apparatuses, wherein the one or more second wireless communication apparatuses are determined based at least in part on the information relating to the second communication system.

In some embodiments, an information processing method is provided, comprising acts of: receiving, by an information processing apparatus configured to communicate with a first wireless communication apparatus via a first communication system, information relating to a second communication system discovered by the first wireless communication apparatus, the second communication system being different from the first communication system; and using the information relating to the second communication system to control grouping of a plurality of wireless communication apparatuses each configured to wirelessly communicate with the information processing apparatus using the first communication system, wherein the plurality of wireless communication apparatuses comprises the first wireless communication apparatus, and wherein controlling grouping of the plurality of wireless communication apparatuses comprises associating the first wireless communication apparatus with one or more second wireless communication apparatuses, wherein the one or more second wireless communication apparatuses are determined based at least in part on the information relating to the second communication system.

In some embodiments, at least one non-transitory computer-readable medium is provided, having encoded thereon instructions which, when executed, cause a computer to perform a method comprising acts of: receiving, by an information processing apparatus configured to communicate with a first wireless communication apparatus via a first communication system, information relating to a second communication system discovered by the first wireless communication apparatus, the second communication system being different from the first communication system; and using the information relating to the second communication system to control grouping of a plurality of wireless communication apparatuses each configured to wirelessly communicate with the information processing apparatus using the first communication system, wherein the plurality of wireless communication apparatuses comprises the first wireless communication apparatus, and wherein controlling grouping of the plurality of wireless communication apparatuses comprises associating the first wireless communication apparatus with one or more second wireless communication apparatuses, wherein the one or more second wireless communication apparatuses are determined based at least in part on the information relating to the second communication system.

Advantageous Effects of Invention

According to an embodiment of the present technology, the plurality of wireless communication apparatuses are appropriately grouped highly effectively. It should be understood that the effect described here is not necessarily limited, but may be any effect descried in the present disclosure.

BRIEF DESCRIPTION OF DRAWINGS

FIG. 3 is a schematic table illustrating exemplary contents of a discovered-device database 330 according to the embodiment of the present technology.

FIG. 6 is a schematic table illustrating exemplary contents of an association database 340 according to the embodiment of the present technology.

FIG. 10 is a schematic table illustrating exemplary contents of a reception result database 130 according to the embodiment of the present technology.

FIG. 13 is a schematic table illustrating exemplary contents of a group database 160 according to the embodiment of the present technology.

FIG. 15 is a schematic table illustrating device correspondence information generated by a control unit 120 according to the embodiment of the present technology.

FIG. 20 is a block diagram illustrating an exemplary schematic configuration of a wireless access point.

DESCRIPTION OF EMBODIMENTS

An embodiment of the present technology (hereinafter, referred to as embodiment) will be described below. Description will be given in the following order.
1. Embodiment (an example of grouping a plurality of wireless communication apparatuses connected with an information processing apparatus based on environmental information about another communication system, using a first communication system)
2. Applications 1. Embodiment

[Exemplary Configuration of Communication System]

Figure 1:
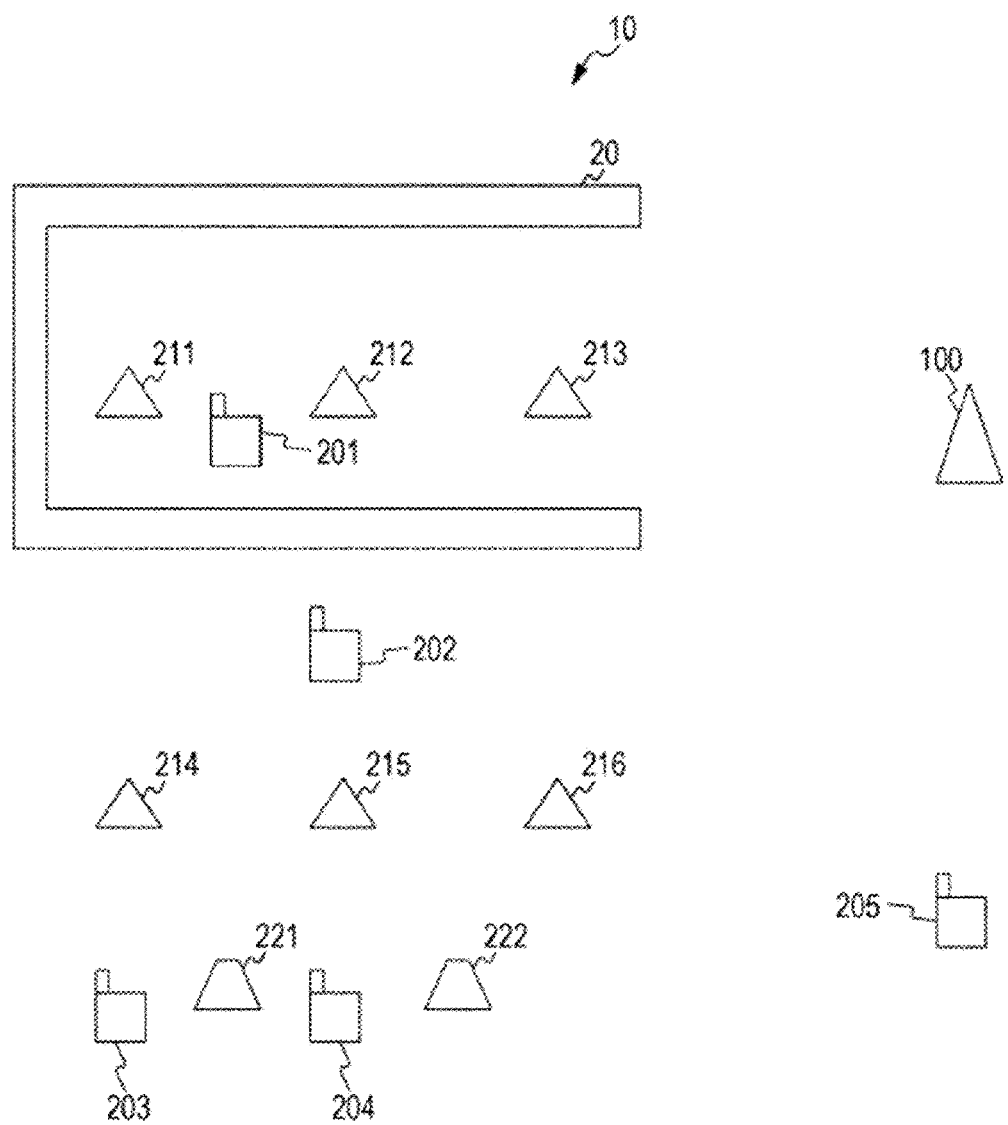
FIG. 1 is a diagram illustrating an exemplary system configuration of a communication system 10 according to an embodiment of the present technology.

FIG. 1 is a diagram illustrating an exemplary system configuration of a communication system 10 according to an embodiment of the present technology. FIG. 1 mainly illustrates an example of a connection mode of a wireless network.

The communication system 10 includes an information processing apparatus 100, wireless communication apparatuses 201 to 205, electronic devices 211 to 216, and electronic devices 221 and 222. The wireless communication apparatus 201 and the electronic devices 211 to 213 should be assumed to be surrounded by an obstruction 20. Note that the obstruction 20 is, for example, a building wall. Further, in FIG. 1, an example of the obstruction 20 having a U-shape in a top view is described, but the embodiment of the present technology can be also applied to another obstruction.

The information processing apparatus 100 is a node configured to perform wireless communication by the first communication system. Here, the first communication system is, for example, a wireless local area network (LAN). The wireless LAN can employ, for example, wireless fidelity (Wi-Fi), an ad hoc network, a mesh network. For example, the information processing apparatus 100 includes an access point configured to connect each wireless communication apparatus using wireless communication via the first communication system for information exchange. The information processing apparatus 100 may be connected to another public network (e.g., Internet).

The wireless communication apparatuses 201 to 205 are nodes configured to be connected to the information processing apparatus 100 using the wireless communication via the first communication system.

Further, the wireless communication apparatuses 201 to 205 are should be assumed to perform wireless communication via the second communication system. Here, the second communication system should be assumed to be a communication system different from the first communication system. For example, the second communication system is Bluetooth (registered trademark).

Further, the wireless communication apparatuses 201 to 205 are should be assumed to perform wireless communication via a third communication system. Here, the third communication system should be assumed to be a communication system different from both of the first and second communication systems. For example, the third communication system may employ visible light communication, near field communication (NFC), millimeter-wave communication (60 GHz etc.), a 900 MHz/2.4 GHz/5 GHz wireless LAN, or an ultra wide band (UWB).

As described above, the wireless communication apparatuses 201 to 205 include at least one of a reception function and transmission and reception function for each of the first communication system, the second communication system, and the third communication system.

The electronic devices 211 to 216 are nodes configured to perform wireless communication via the second communication system.

The electronic devices 221 and 222 are nodes configured to perform wireless communication via the third communication system.

For example, the information processing apparatus 100, the electronic devices 211 to 216, the electronic devices 221 and 222 can be a stationary information processing apparatus including, for example, a wireless communication function. Further, the wireless communication apparatuses 201 to 205 can be for example a portable information processing apparatus including a wireless communication function.

Here, the portable information processing apparatus is, for example, an information processing apparatus such as a smartphone, a mobile phone, or a tablet terminal. Further, the stationary information processing apparatus is, for example, an information processing apparatus such as an access point, a printer, a personal computer, or a light.

For example, when the communication system 10 is established in a department store, the electronic devices 211 to 216 can be defined as a stationary device (e.g., audio device, video device) installed in the department store, and the electronic devices 221 and 222 can be defined as a light mounted on a ceiling of the department store. Further, for example, the wireless communication apparatuses 201 to 205 can be defined as a portable information processing apparatus (e.g., smartphone) of a customer. In this configuration, for example, from the electronic devices 211 to 216, and the electronic devices 221 and 222, information about a recommended merchandise product sold in the department store, a recipe for a recommended food, or the like is distributed to the wireless communication apparatuses 201 to 205.

Here, an example of multicast transmission in the communication system 10 will be described, according to the embodiment of the present technology. It is noted that the multicast transmission is a transmission system in which one apparatus is defined as a transmission terminal, a plurality of apparatuses are defined as receiving terminals, and one packet transmitted from the transmission terminal is received by the plurality of receiving terminals. In the embodiment of the present technology, an example will be described in which the information processing apparatus 100 is defined as the transmission terminal, and the wireless communication apparatuses 201 to 205 are defined as the receiving terminals.

It should be understood that the receiving terminal is not limited to all wireless communication apparatuses 201 to 205 connected to the information processing apparatus 100. For example, only some of the wireless communication apparatuses 201 to 205 (e.g., wireless communication apparatuses 201, 202, 203) may be defined as the receiving terminals.

Further, each of the electronic devices 211 to 216 transmits a signal including a unique identifier (e.g., media access control (MAC) address) of the apparatus itself to multiple addresses periodically or irregularly. Similarly, each of the electronic devices 221 and 222 transmits a signal including a unique identifier (e.g., MAC address) of the apparatus itself to multiple addresses periodically or irregularly. That is, it should be assumed that each of the electronic devices 211 to 216, and the electronic devices 221 and 222 should be assumed to function as a transmitter.

Further, in the embodiment of the present technology, as a communication system other than the first communication system, two communication systems (second communication system, third communication system) will be exemplified, but the number of communication systems other than the first communication system is not limited to two. For example, the embodiment of the present technology can be applied, when only one communication system is used, or three or more communication systems are used, as the communication system other than the first communication system.

Further, a communication system other than the above-mentioned communication system may be used. For example, the embodiment of the present technology can be also applied to an ultrasonic communication system.

[Exemplary Configuration of Wireless Communication Apparatus]

Figure 2:
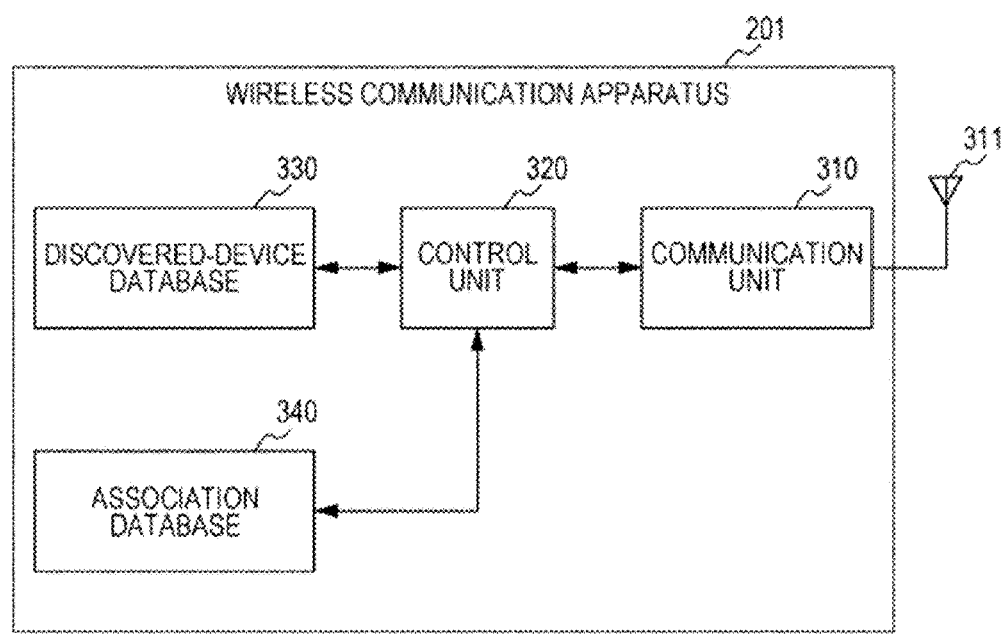
FIG. 2 is a block diagram illustrating an exemplary internal configuration of a wireless communication apparatus 201 according to the embodiment of the present technology.

FIG. 2 is a block diagram illustrating an exemplary internal configuration of the wireless communication apparatus 201 according to the embodiment of the present technology. It is noted that an internal configurations of the other devices (wireless communication apparatuses 202 to 205, electronic devices 211 to 216, electronic devices 221 and 222) are substantially the same as the internal configuration of the wireless communication apparatus 201, so that only the internal configuration of the wireless communication apparatus 201 will be described here, and descriptions of the other devices are not given.

The wireless communication apparatus 201 includes a communication unit 310, an antenna 311, a control unit 320, a discovered-device database 330, and an association database 340.

The communication unit 310 is a device (e.g., wireless LAN modem) configured to transmit and receive a radio wave through the antenna 311. The communication unit 310 can perform wireless communication via each of the first communication system, the second communication system, and the third communication system.

The communication unit 310 may achieve wireless communication via the plurality of communication systems using different device, or may achieve wireless communication via the plurality of communication systems using the same physical device.

The control unit 320 controls each section of the wireless communication apparatus 201 based on a control program. For example, the control unit 320 performs signal processing of transmitted and received information. Further, for example, the control unit 320 includes a central processing unit (CPU).

For example, when the communication unit 310 transmits data using the wireless communication, the control unit 320 processes information to be transmitted, and generates a chunk of data (transmission packet) actually transmitted. Subsequently, the control unit 320 outputs the generated transmission packet to the communication unit 310. Further, the communication unit 310 converts the transmission packet to a format or the like of the communication system via which the transmission packet is actually transmitted, and then transmits the converted transmission packet from the antenna 311 to the outside.

Further, for example, when the communication unit 310 receives data using the wireless communication, the communication unit 310 subjects a radio signal received through the antenna 311 to signal processing performed by a receiver in the communication unit 310, and extracts a reception packet. The control unit 320 interprets the extracted reception packet. As a result of the interpretation, when the packet is determined to have data to be held, the control unit 320 writes the data to each database.

The discovered-device database 330 is a database configured to store information about the device (transmitter) discovered by the wireless communication apparatus 201. The discovered-device database 330 will be described in detail with reference to FIG. 3. The transmitter is, for example, a device (information processing apparatus, wireless communication apparatus, electronic device) configured to emit a signal corresponding to at least one of the first communication system, the second communication system, and the third communication system.

The association database 340 is a database configured to store information about association with the transmitter discovered by the wireless communication apparatus 201. The association database 340 will be described in detail with reference to FIG. 4.

[Exemplary Contents of Discovered-Device Database]

FIG. 3 is a schematic table illustrating exemplary contents of the discovered-device database 330 according to the embodiment of the present technology.

In the discovered-device database 330, a communication system ID 331, a transmitter unique identifier 332, signal intensity 333, an estimated distance 334 to the transmitter, transmitter discovery time 335, fixation 336, and absolute positional information 337 are stored in an association manner.

The communication system ID 331 stores an ID in the communication system used by the transmitter when the transmitter is discovered by the wireless communication apparatus 201. In FIGS. 3 and 6 or the like, an ID in the first communication system is defined as "1", an ID in the second communication system is defined as "2", and an ID in the third communication system is defined as "3".

The transmitter unique identifier 332 stores a unique identifier of the transmitter discovered by the wireless communication apparatus 201. The unique identifier can employ, for example, a MAC address.

The signal intensity 333 stores information about the strength of the signal (signal intensity) received from the transmitter when the transmitter is discovered by the wireless communication apparatus 201. The signal intensity is called received signal intensity indicator (RSSI), for example in the wireless LAN. Further, in RSSI, the signal intensity is represented in a unit of dBm.

The estimated distance 334 to the transmitter stores an estimated distance to the another wireless communication apparatus (transmitter) discovered by the wireless communication apparatus 201. The estimated distance is calculated based on, for example, the received signal intensity. For example, the estimated distance can be calculated, using a property (distance attenuation) that the received signal intensity attenuates in inverse proportion to the distance.

The transmitter discovery time 335 stores time at which the transmitter is discovered by the wireless communication apparatus 201.

The fixation 336 stores the type of the transmitter (e.g., stationary apparatus, portable apparatus) discovered by the wireless communication apparatus 201. In the embodiment of the present technology, as the type of the transmitter, an example of storage of information (Yes, No) about whether the transmitter is fixed will be descried.

The absolute positional information 337 stores information about the position (absolute positional information) of the transmitter discovered by the wireless communication apparatus 201. The absolute positional information represents, for example, positional information (e.g., latitude, longitude, altitude) acquired by a positional information acquisition unit (e.g., global positioning system (GPS) receiver) provided in the transmitter. In this configuration, for example, the transmitter can transmit the positional information acquired by the positional information acquisition unit, in a broadcast signal. The wireless communication apparatus 201 acquires the positional information in the broadcast signal, and stores the acquired positional information in the absolute positional information 337.

Next, a perimeter monitoring method by the wireless communication apparatus 201 will be described.

[Example of Registration to Discovered-Device Database]

Figure 4:
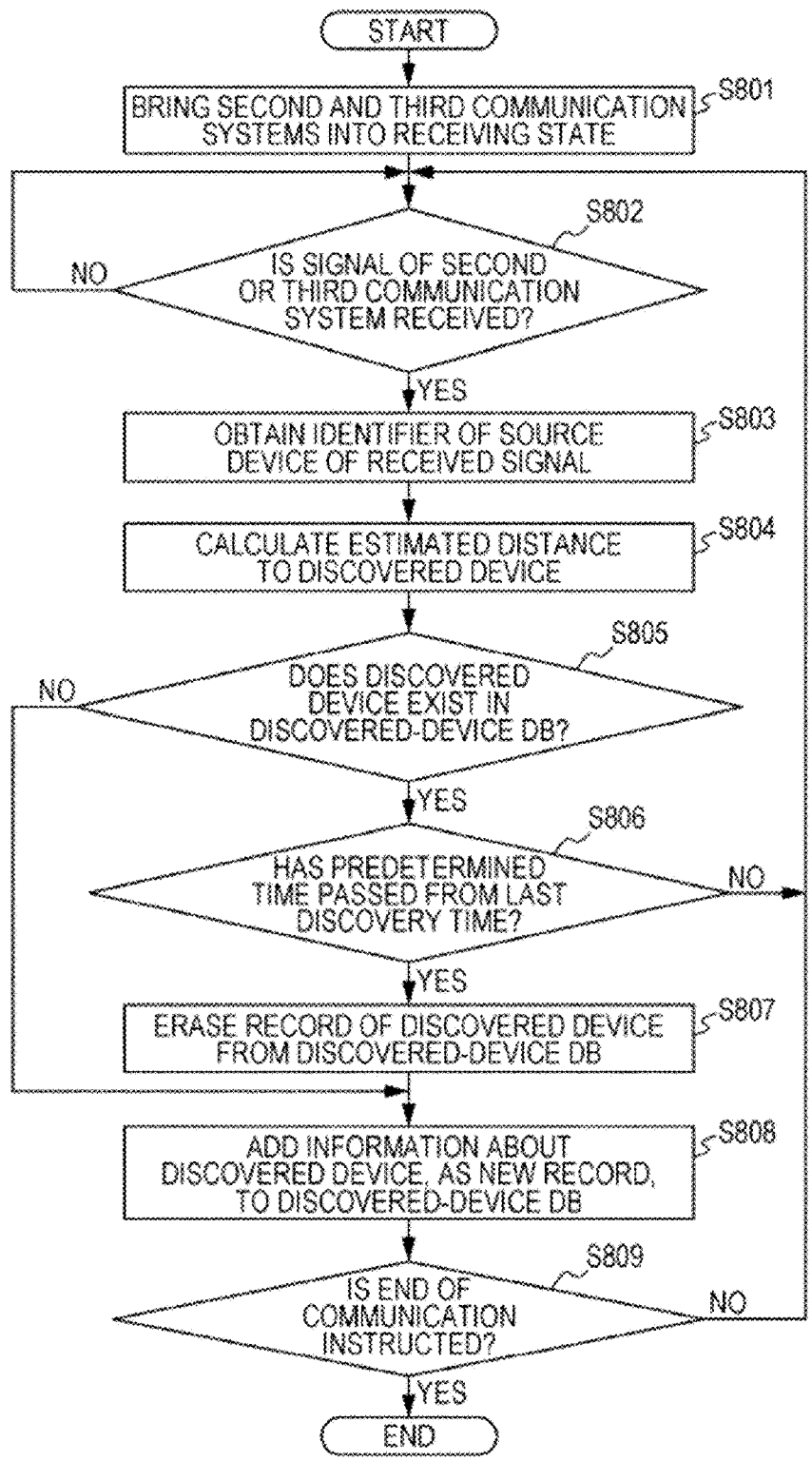
FIG. 4 is a flowchart illustrating an exemplary procedure of registration processing to the discovered-device database by the wireless communication apparatus 201 according to the embodiment of the present technology.

FIG. 4 is a flowchart illustrating an exemplary procedure of registration processing to the discovered-device database by the wireless communication apparatus 201 according to the embodiment of the present technology.

When the wireless communication apparatus 201 monitors the periphery thereof, the control unit 320 of the wireless communication apparatus 201 brings both of the second and third communication systems into a receiving state (step S801). The control unit 320 determines whether the signal (broadcast signal) of the second or third communication system is received (step S802). When any of the signals of the second and third communication systems is not received (step S802), the monitoring is continuously performed.

When the signal of the second or third communication system is received (step S802), the control unit 320 acquires the unique identifier of the transmitter, assigned by the communication system of the received signal from the received signal (step S803). Further, the control unit 320 acquires other information (e.g., fixation, positional information) included in the received signal (step S803). Further, the control unit 320 acquires the signal intensity upon reception of the signal (step S803).

Subsequently, the control unit 320 calculates, based on the signal intensity of the received signal, the estimated distance to the transmitter (discovered device) having emitted the received signal (step S804).

Further subsequently, the control unit 320 determines whether the discovered device has been stored in the discovered-device database 330 (step S805). When the discovered device has not been stored in the discovered-device database 330 (step S805), the control unit 320 adds the information about the discovered device, as a new record, to the discovered-device database 330 (step S808). That is, the control unit 320 stores, as records, the identifier of the communication system (e.g., second communication system), the unique identifier of the transmitter, the signal intensity, the calculated estimated distance, the discovery time in the discovered-device database 330 (step S808).

When the discovered device has been stored in the discovered-device database 330 (step S805), the control unit 320 determines whether a predetermined time has passed from the last time the discovered device was discovered (step S806). The determination can be performed based on, for example, a content of the transmitter discovery time 335 of the discovered-device database 330.

When the predetermined time has not passed from the last time the discovered device was discovered (step S806), the process returns to step S802 without registering the information about the discovered device to the discovered-device database 330. On the other hand, when the predetermined time has passed from the last time the discovered device was discovered (step S806), the control unit 320 erases the information about the discovered device from the discovered-device database 330 (step S807). Subsequently, the control unit 320 adds, as the new record, the information about the discovered device to the discovered-device database 330 (step S808). That is, the information about the discovered device is updated to the latest information.

Further, it is determined whether the end of communication is instructed (step S809), and when the end of communication is instructed, the operation of the registration processing to the discovered-device database is finished. While, when the end of communication is not instructed (step S809), the process returns to step S802.

Here, as described above, when the positional information of a discovered transmitter can be acquired, the control unit 320 stores the positional information in the discovered-device database 330. For example, when each device transmits positional information about the apparatus itself in the broadcast signal, the control unit 320 can acquire the positional information in the broadcast signal received. Further, each device can record the positional information about the apparatus itself in an external apparatus (e.g., server on the internet) periodically or irregularly. In this configuration, the control unit 320 can acquire the positional information about each device from the external apparatus.

Further, when the type of the discovered transmitter (e.g., stationary apparatus, portable apparatus) can be acquired, the control unit 320 stores the type thereof in the discovered-device database 330. For example, when each device transmits the type of apparatus itself in the broadcast signal, the control unit 320 can acquire the type of the transmitter in the broadcast signal received. Further, each device can record the type of apparatus itself in the external apparatus. In this configuration, the control unit 320 can acquire the type of transmitter from the external apparatus.

As described above, the control unit 320 can discover another device based on multi-address transmission from each device. It is also assumed that the second or third communication system determines a device discovery procedure. In this configuration, the control unit 320 may use the device discovery procedure to discover a corresponding device using the second or third communication system. For example, in step S801, the control unit 320 can transmit a device discovery command to discover the device using the second or third communication system. It is noted that, for example, when the communication system uses Bluetooth, Inquiry procedure is defined as the device discovery procedure.

As described above, even when the device is discovered using the device discovery procedure, the control unit 320 similarly stores, as records, the identifier of the communication system, the unique identifier of the transmitter, the signal intensity, the calculated estimated distance, the discovery time in the discovered-device database 330.

[Example of Reporting Perimeter Monitoring Result]

When the control unit 320 of the wireless communication apparatus 201 discovers the device corresponding to the second or third communication system, information about the discovered device is reported to the information processing apparatus 100. For example, the control unit 320 transmits and reports the contents stored in the discovered-device database 330 illustrated in FIG. 3 to the information processing apparatus 100. An example of this operation will be illustrated in FIG. 5.

Figure 5:
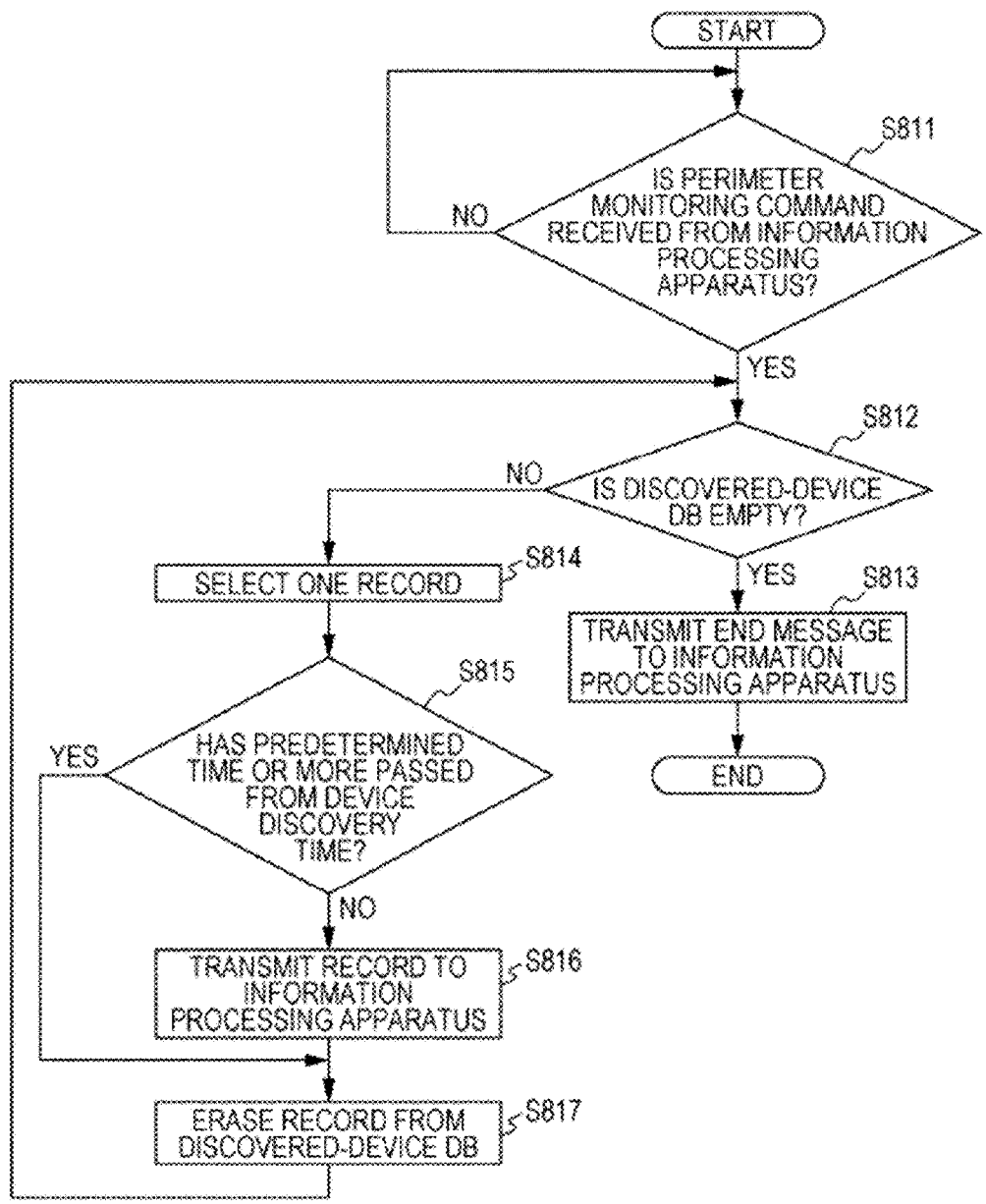
FIG. 5 is a flowchart illustrating an exemplary procedure of a process of reporting a perimeter monitoring result by the wireless communication apparatus 201 according to the embodiment of the present technology.

FIG. 5 is a flowchart illustrating an exemplary procedure of a process of reporting a perimeter monitoring result by the wireless communication apparatus 201 according to the embodiment of the present technology. The procedure is performed as interrupt processing.

First, the control unit 320 determines whether a perimeter monitoring command is received from the information processing apparatus 100 (step S811). When the perimeter monitoring command is not received (step S811), monitoring is continuously performed.

When the perimeter monitoring command is received (step S811), the control unit 320 determines whether the discovered-device database 330 is empty (step S812). That is, it is determined whether no device is registered in the discovered-device database 330.

When the discovered-device database 330 is empty (step S812), the control unit 320 transmits an end message to the information processing apparatus 100 (step S813), and ends the operation of the process of reporting a perimeter monitoring result.

When the discovered-device database 330 is not empty (step S812), the control unit 320 selects one record from the discovered-device database 330 (step S814). That is, each information about one device is taken from the discovered-device database 330.

Subsequently, the control unit 320 determines whether a predetermined time has passed from the last time the device having the selected record was discovered (step S815). The determination can be performed based on, for example, a content of the transmitter discovery time 335 of the discovered-device database 330.

When the predetermined time has passed from the last time the device having the selected record was discovered (step S815), the control unit 320 erases the selected record from the discovered-device database 330 (step S817), and the process returns to step S812.

When the predetermined time has not passed from the last time the device having the selected record was discovered (step S815), the control unit 320 transmits the selected record to the information processing apparatus 100, using the first communication system (step S816), and the process proceeds to step S817.

As described above, the control unit 320 acquires the environmental information about the electronic device around the wireless communication apparatus 201, corresponding to the communication system other than the first communication system, and transmits the acquired environmental information to the information processing apparatus 100, using first communication system. The environmental information includes, for example, identification information, signal intensity, and an estimated distance assigned by another communication system.

[Exemplary Contents of Association Database]

FIG. 6 is a schematic table illustrating exemplary contents of the association database 340 according to the embodiment of the present technology.

In the association database 340, a communication system ID 341, a transmitter unique identifier 342, another communication system ID 343, and a unique identifier 344 of the another communication system are stored in an association manner. It is noted that the communication system ID 341 and the transmitter unique identifier 342 correspond to the communication system ID 331 and the transmitter unique identifier 332 illustrated in FIG. 3, respectively.

The another communication system ID 343 stores another communication system ID allowed to be used by the transmitter discovered by the wireless communication apparatus 201. That is, the another communication system ID 343 stores an ID of the communication system different from the communication system corresponding to the ID having been stored in the communication system ID 331.

The unique identifier 344 of the another communication system stores a unique identifier of the transmitter discovered by the wireless communication apparatus 201 (unique identifier assigned by the communication system corresponding to the ID having been stored in the another communication system ID 343).

An association method will be described in detail with reference to FIGS. 7 and 8.

[Example of Association of Identifiers]

Figure 7:
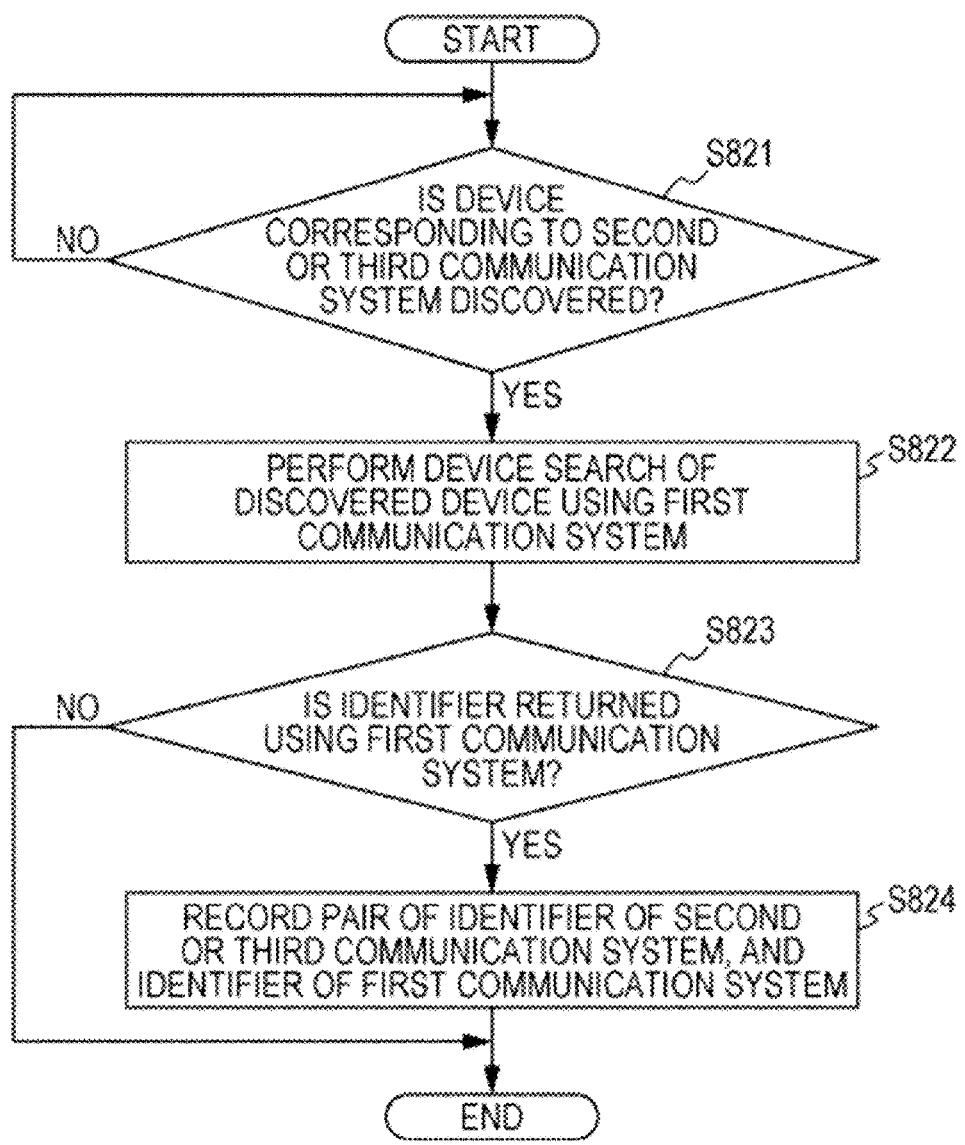
FIG. 7 is a flowchart illustrating an exemplary procedure of identifier association processing by a wireless communication apparatus 201 according to the embodiment of the present technology.

FIG. 7 is a flowchart illustrating an exemplary procedure of identifier association processing by the wireless communication apparatus 201 according to the embodiment of the present technology.

First, the control unit 320 determines whether the device corresponding to the second or third communication system is discovered (step S821). When the device corresponding to the second or third communication system is not discovered (step S821), the monitoring is continuously performed.

When the device corresponding to the second or third communication system is discovered (step S821), the control unit 320 performs device search of the discovered device using the first communication system (step S822). That is, when the device corresponding to the second or third communication system (device having an identifier of the second or third communication system) is discovered, the control unit 320 checks whether the device corresponds to the first communication system. In this configuration, the device corresponding to both of at least one of the second and third communication systems, and the first communication system can grasp the device search using the identifier of the second or third communication system which is applied to the apparatus itself. The device subjected to the device search using the identifier of the second or third communication system which is applied to the apparatus itself transmits the identifier assigned by the first communication system using the first communication system.

Subsequently, the control unit 320 determines whether the identifier (identifier assigned by the first communication system) is returned using the first communication system (step S823). When the identifier is not returned using the first communication system (step S823), operation of identifier association processing is ended.

When the identifier is returned using the first communication system (step S823), the control unit 320 records a pair of the identifier assigned by the second or third communication system, and the identifier assigned by the first communication system (step S824). That is, the control unit 320 stores the pair of the identifier assigned by the second or third communication system, and the identifier assigned by the first communication system, in the association database 340 (step S824).

[Exemplary Operation of Electronic Device]

Figure 8:
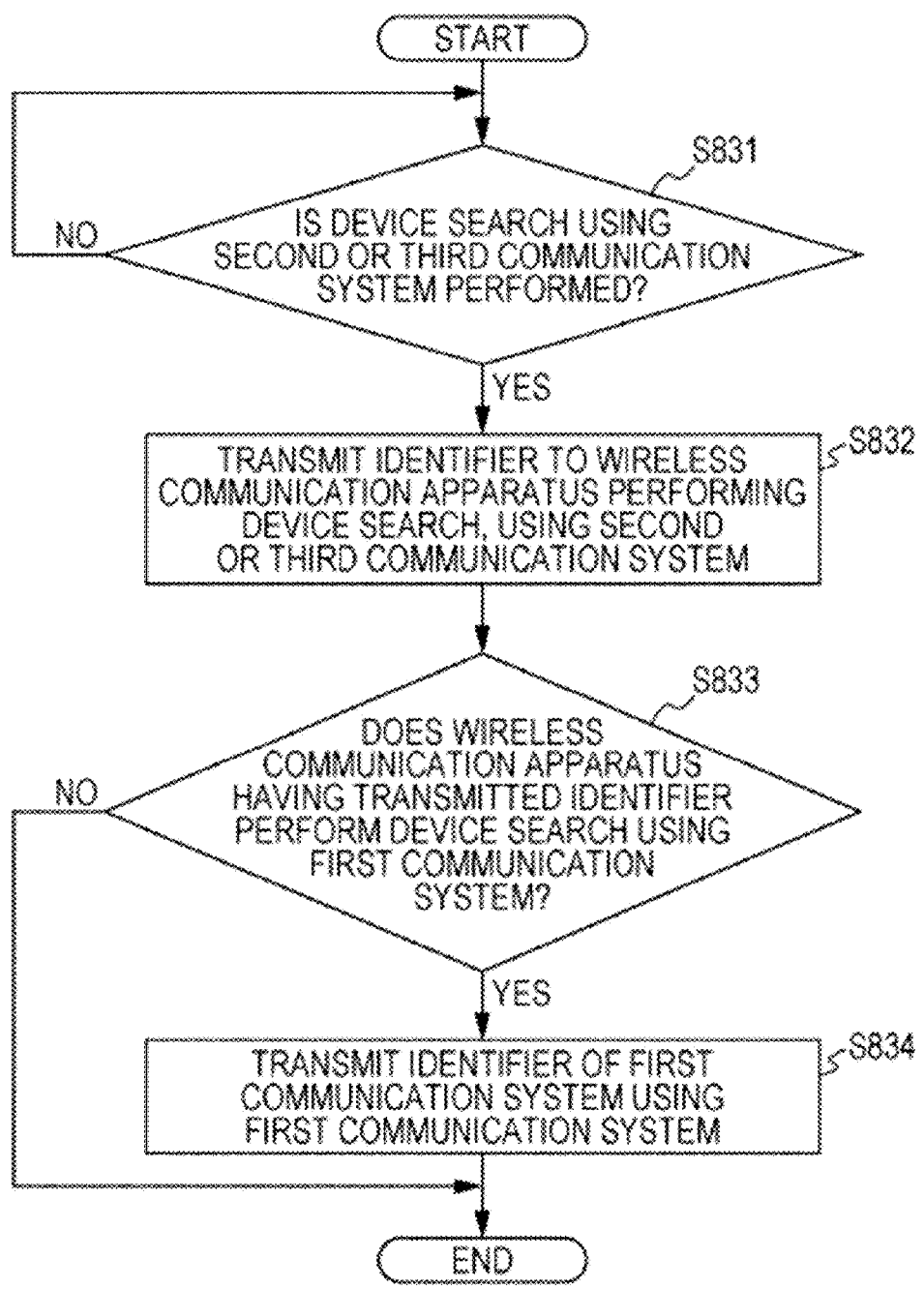
FIG. 8 is a flowchart illustrating an exemplary procedure of communication processing by an electronic device according to the embodiment of the present technology.

FIG. 8 is a flowchart illustrating an exemplary procedure of communication processing by the electronic device according to the embodiment of the present technology. The electronic device should be assumed to correspond to at least one of the second and third communication systems, and the first communication system.

First, the control unit of the electronic device determines whether the device search using the second or third communication system is performed (step S831). When the device search using the second or third communication system is not performed (step S831), the monitoring is continuously performed.

When the device search using the second or third communication system is performed (step S831), the control unit of the electronic device answer the device search (step S832). That is, the control unit of the electronic device transmits the identifier of the second or third communication system which is applied to the apparatus itself to the information processing apparatus performing the device search, using the second or third communication system to which the apparatus itself corresponds (step S832). When the apparatus itself corresponds to both of the second and third communication systems, the identifiers of the second and third communication systems which are applied to the apparatus itself can be transmitted simultaneously or sequentially.

Subsequently, the control unit of the electronic device determines whether the information processing apparatus having transmitted the identifier performs the device search using the first communication system (step S833). When the device search using the first communication system is not performed (step S833), operation of the communication processing is ended.

When the device search using the first communication system is performed (step S833), the control unit of the electronic device answer the device search (step S834). That is, the control unit of the electronic device transmits the identifier of the first communication system which is applied to the apparatus itself to the information processing apparatus performing the device search, using first communication system to which the apparatus itself corresponds (step S834).

As illustrated in FIGS. 7 and 8, when the second or third communication system is used to discover the device, the control unit 320 of the wireless communication apparatus 201 confirms whether the device corresponding to the second or third communication system corresponds to the first communication system. When the discovered device also corresponds to first communication system, the control unit 320 of the wireless communication apparatus 201 stores a pair of the identifier assigned by the second or third communication system, and the identifier assigned by the first communication system in the association database 340.

As described above, the control unit 320 of the wireless communication apparatus 201 associates identification information in the first communication system and another communication system about the electronic device corresponding to the first communication system and the another communication system around the wireless communication apparatus, with each other. The control unit 320 transmits the associated identification information about the electronic device to the information processing apparatus 100, using the first communication system.

[Exemplary Configuration of Information Processing Apparatus]

Figure 9:
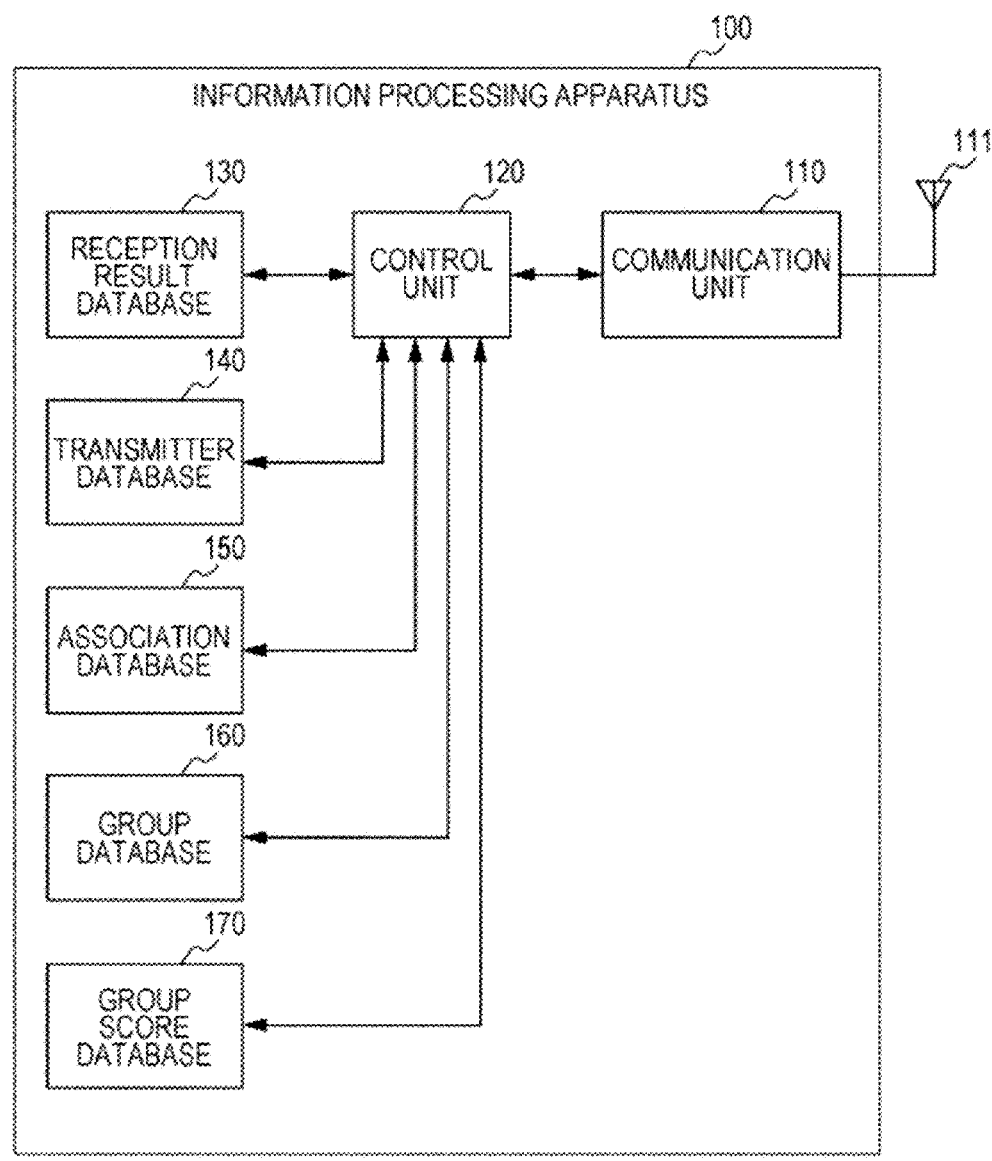
FIG. 9 is a block diagram illustrating an exemplary internal configuration of an information processing apparatus 100 according to the embodiment of the present technology.

FIG. 9 is a block diagram illustrating an exemplary internal configuration of the information processing apparatus 100 according to the embodiment of the present technology.

The information processing apparatus 100 includes a communication unit 110, an antenna 111, a control unit 120, a reception result database 130, a transmitter database 140, an association database 150, a group database 160, and a group score database 170.

The communication unit 110 is a device (e.g., wireless LAN modem) configured to transmit and receive a radio wave through the antenna 111. For example, the communication unit 110 can perform wireless communication via the first communication system.

The control unit 120 controls each section of the information processing apparatus 100 based on a control program. For example, the control unit 120 performs signal processing of transmitted and received information. Further, for example, the control unit 120 includes a CPU.

For example, when the communication unit 110 transmits data using the wireless communication, the control unit 120 processes information to be transmitted, and generates a chunk of data (transmission packet) actually transmitted. Subsequently, the control unit 120 outputs the generated transmission packet to the communication unit 110. Further, the communication unit 110 converts the transmission packet to a format or the like of the communication system via which the transmission packet is actually transmitted, and then transmits the converted transmission packet from the antenna 111 to the outside.

Further, for example, when the communication unit 110 receives data using the wireless communication, the communication unit 110 subjects a radio signal received through the antenna 111 to signal processing performed by a receiver in the communication unit 110, and extracts a reception packet. The control unit 120 interprets the extracted reception packet. As a result of the interpretation, when the packet is determined to have data to be held, the control unit 120 writes the data to each database.

Further, for example, the control unit 120 performs control to group the wireless communication apparatuses, based on the environmental information acquired from each wireless communication apparatus configured to perform wireless communication between itself and the information processing apparatus 100, using the first communication system. Here, environmental information is information about another communication system, acquired by each wireless communication apparatus, using the another communication system (e.g., second communication system, third communication system) other than the first communication system.

For example, the environmental information is information about signal intensity between an electronic device discovered by the wireless communication apparatus, using the another second communication system (e.g., second communication system, third communication system) other than the first communication system, and the wireless communication apparatus. The environmental information is, for example, information about the distance between the electronic device and the wireless communication apparatus. Further, the environmental information can employ at least one of the information about signal intensity and the information about the distance.

Further, for example, the environmental information includes identification information of the electronic device discovered by the wireless communication apparatus using the another communication system, and information about the signal intensity of the electronic device.

Further, for example, the environmental information includes the identification information of the electronic device discovered by the wireless communication apparatus using the another communication system, and information about the received power of the electronic device.

Further, for example, the environmental information includes the identification information of the electronic device discovered by the wireless communication apparatus using the another communication system, and information about an estimated distance from the wireless communication apparatus to the electronic device.

The reception result database 130 is a database configured to store information (the contents of the discovered-device database 330 illustrated in FIG. 3) transmitted from each wireless communication apparatus. The reception result database 130 will be described in detail with reference to FIG. 10.

The transmitter database 140 is a database configured to store information about the transmitter discovered by the information processing apparatus 100. The transmitter database 140 will be described in detail with reference to FIG. 11.

The association database 150 is a database configured to store information about association between the transmitters discovered by the information processing apparatus 100. The association database 150 will be described in detail with reference to FIG. 12.

The group database 160 is a database configured to store information about grouping of the transmitters discovered by the information processing apparatus 100. The group database 160 will be described in detail with reference to FIG. 13.

The group score database 170 is a database configured to store information about a score calculated for a group. The group score database 170 will be described in detail with reference to FIG. 14.

[Exemplary Contents of Reception Result Database]

FIG. 10 is a schematic table illustrating exemplary contents of the reception result database 130 according to the embodiment of the present technology.

In the reception result database 130, a unique identifier 131 of the wireless communication apparatus, a communication system ID 132 of the discovered transmitter, a unique identifier 133 of the discovered transmitter, signal intensity 134, an estimated distance 135 to the transmitter, and a transmitter discovery time 136 are stored in an association manner.

Here, the communication system ID 132 of the discovered transmitter, the unique identifier 133 of the discovered transmitter, the signal intensity 134, the estimated distance 135 to the transmitter, and the transmitter discovery time 136 correspond to the contents of the discovered-device database 330 illustrated in FIG. 3. That is, the component elements 132 to 136 correspond to the communication system ID 331, the transmitter unique identifier 332, the signal intensity 333, the estimated distance 334 to the transmitter, and the transmitter discovery time 335.

The unique identifier 131 of the wireless communication apparatus is a unique identifier of the wireless communication apparatus, as a transmission source, transmitting respective corresponding information. In the embodiment of the present technology, the information processing apparatus 100 performs wireless communication using the first communication system, so that a unique identifier 131 of the wireless communication apparatus stores a unique identifier assigned by the first communication system.

Here, each wireless communication apparatus transmits the contents of the discovered-device database of the apparatus itself (e.g., discovered-device database 330 illustrated in FIG. 3) to the information processing apparatus 100 periodically or irregularly. Further, the control unit 120 of the information processing apparatus 100 stores the contents of the discovered-device database transmitted from each wireless communication apparatus (e.g., discovered-device database 330 illustrated in FIG. 3) in the reception result database 130 in association with the wireless communication apparatus, being the transmission source.

For example, the unique identifier of the wireless communication apparatus 201, assigned by the first communication system, is expressed as "ss-ss-ss-ss-ss". For example, it is assumed that the wireless communication apparatus 201 transmits the contents of the discovered-device database 330 illustrated in FIG. 3, and the contents are received by the information processing apparatus 100. In this case, as illustrated in FIG. 10, the contents of the discovered-device database 330 illustrated in FIG. 3 are sequentially stored, in association with the unique identifier 131 of the wireless communication apparatus "ss-ss-ss-ss-ss".

Further, even when the contents transmitted from the another wireless communication apparatus is received by the information processing apparatus 100, the received contents are similarly sequentially stored in association with the unique identifier 131 of the wireless communication apparatus.

[Exemplary Contents of Transmitter Database]

Figure 11:
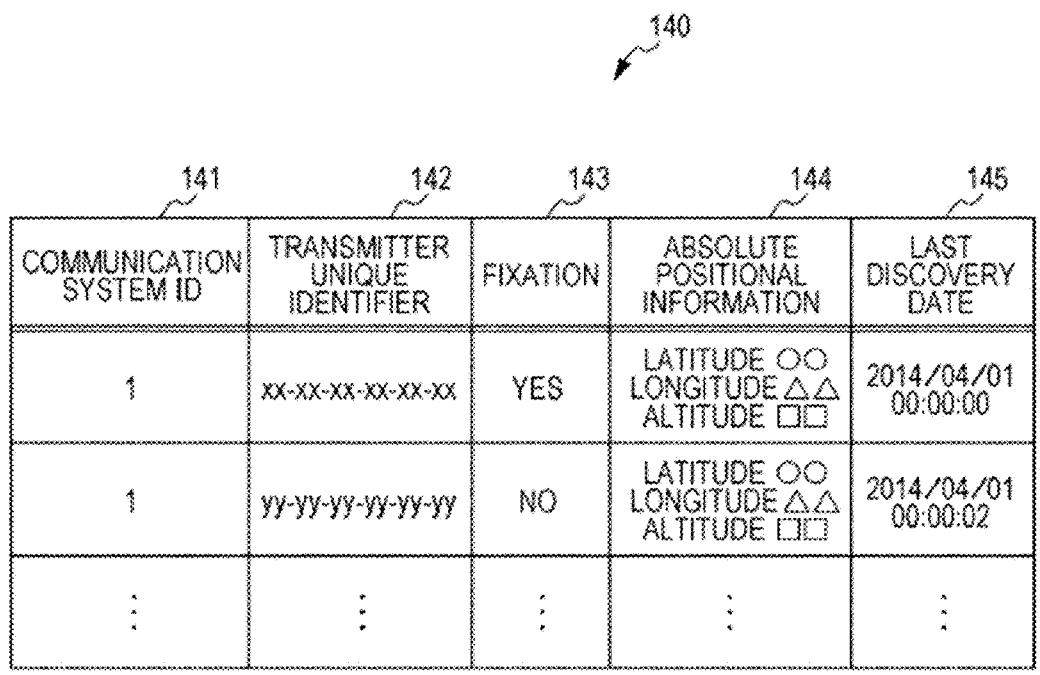
FIG. 11 is a schematic table illustrating exemplary contents of a transmitter database 140 according to the embodiment of the present technology.

FIG. 11 is a schematic table illustrating exemplary contents of a transmitter database 140 according to the embodiment of the present technology.

In the transmitter database 140, a communication system ID 141, a transmitter unique identifier 142, fixation 143, absolute positional information 144, and a last discovery date 145 are stored in an association manner.

It is noted that the communication system ID 141, the transmitter unique identifier 142, the fixation 143, the absolute positional information 144 correspond to the communication system ID 331, the transmitter unique identifier 332, the fixation 336, and the absolute positional information 337 illustrated in FIG. 3.

The last discovery date 145 stores the last date at which the transmitter was discovered by the information processing apparatus 100.

[Exemplary Contents of Association Database]

Figure 12:
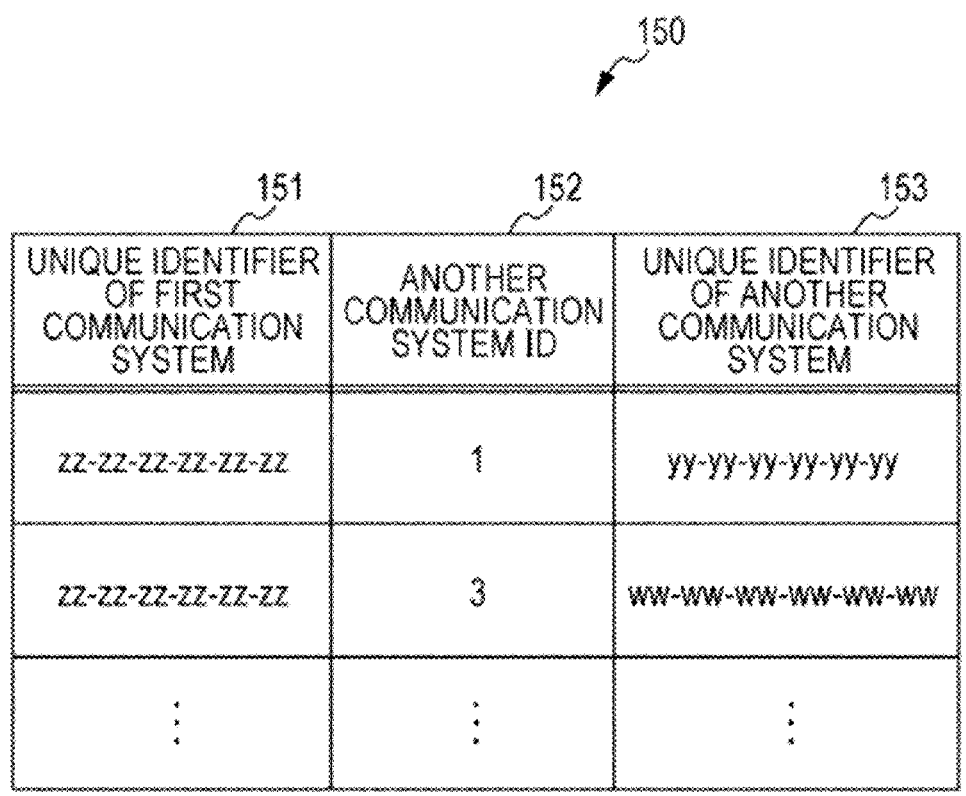
FIG. 12 is a schematic table illustrating exemplary contents of an association database 150 according to the embodiment of the present technology.

FIG. 12 is a schematic table illustrating exemplary contents of the association database 150 according to the embodiment of the present technology.

In the association database 150, a unique identifier 151 of the first communication system, another communication system ID 152, and a unique identifier 153 of the another communication system are stored in an association manner.

That is, the association database 150 associates the unique identifier 151 of the first communication system of the wireless communication apparatus capable of performing wireless communication using the first communication system, with the unique identifier 153 of the another communication system which the wireless communication apparatus can use.

Here, exemplary use of associated information will be described. For example, it is assumed that the wireless communication apparatus connected to the information processing apparatus 100 has the function of the communication system other than the wireless LAN communication system (e.g., Bluetooth), and the information processing apparatus 100 grasps the unique identifier assigned to the communication system. In this configuration, in order to reduce congestion of a wireless LAN network, communication between the information processing apparatus 100 and the wireless communication apparatus can be partially shifted from the wireless LAN to Bluetooth to reduce a load (off-load) on the network. That is, information of the association database 150 is used to reduce a load on the network.

Further, the associated information can be also applied to communication between the wireless communication apparatuses. For example, in order to reduce congestion of the wireless LAN network, communication between two wireless communication apparatuses can be partially shifted from the wireless LAN to Bluetooth to reduce a load on the network. That is, information of the association database 340 illustrated in FIG. 6 is used to reduce a load on the network.

[Exemplary Contents of Group Database]

FIG. 13 is a schematic table illustrating exemplary contents of a group database 160 according to the embodiment of the present technology.

The group database 160 stores information about a group determined by the control unit 120.

In the group database 160, a unique identifier 161 of the wireless communication apparatus, a group identifier 162, a group entry date 163, a representative terminal 164 are stored in an association manner.

The unique identifier 161 of the wireless communication apparatus corresponds to the unique identifier 131 of the wireless communication apparatus illustrated in FIG. 10.

The group identifier 162 stores information for identification of each group.

The group entry date 163 stores an entry date of each wireless communication apparatus to the group.

The representative terminal 164 stores information (Yes, No) representing whether each wireless communication apparatus is a representative terminal of the group.

[Exemplary Contents of Group Score Database]

Figure 14:
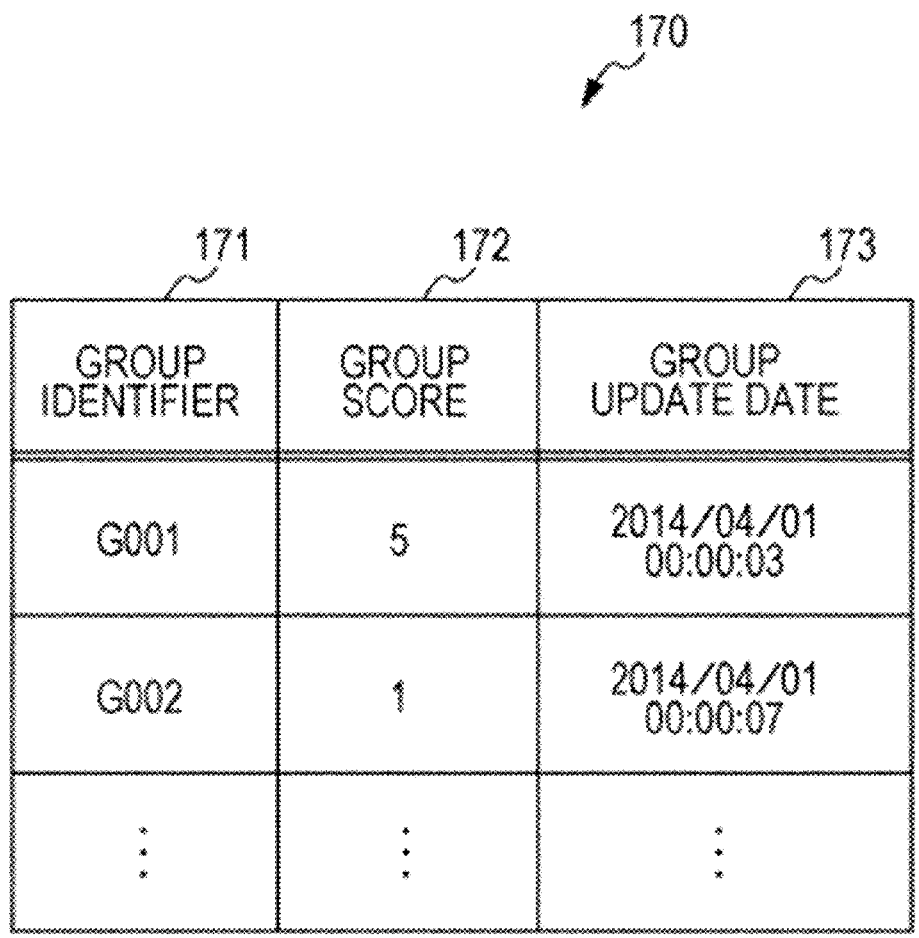
FIG. 14 is a schematic table illustrating exemplary contents of a group score database 170 according to the embodiment of the present technology.

FIG. 14 is a schematic table illustrating exemplary contents of a group score database 170 according to the embodiment of the present technology.

The group score database 170 stores information about a score of the group updated by the control unit 120.

In the group score database 170, a group identifier 171, a group score 172, a group update date 173 are stored in an association manner.

The group identifier 171 corresponds to the group identifier 162 illustrated in FIG. 13.

The group score 172 stores a score calculated for each group (certainty of group). A calculation method for the score will be described in detail with reference to FIG. 15.

The group update date 173 stores the last update date of the corresponding group.

[Exemplary Group Determination of Wireless Communication Apparatus]

As described above, when a result of the perimeter monitoring is reported from each wireless communication apparatus to the information processing apparatus 100, the contents of the perimeter monitoring result are stored in the reception result database 130. Further, the control unit 120 of the information processing apparatus 100 also performs monitoring of the first communication system. Based on the information, the wireless communication apparatuses are grouped. The grouping will be described below.

FIG. 15 is a schematic table illustrating device correspondence information generated by a control unit 120 according to the embodiment of the present technology. The device correspondence information represents a correspondence relationship between a device reporting the perimeter monitoring result (wireless communication apparatuses 201 to 205 connected to the information processing apparatus 100), and another device which the device has found (transmitter emitting a signal of the second or third communication system). Specifically, in FIG. 15, the device reporting the perimeter monitoring result (wireless communication apparatuses 201 to 205 connected to the information processing apparatus 100) is represented as a receiving side. Further, the another device which the device on the receiving side has found (transmitter corresponding to the second or third communication system) is assorted to correspondence or non-correspondence to the first communication system.

In FIG. 15, each device should be assumed to be represented by a reference sign of each device (information processing apparatus 100, wireless communication apparatuses 201 to 205, electronic devices 211 to 216, electronic devices 221 and 222) illustrated in FIG. 1.

The control unit 120 generates device correspondence information representing the correspondence relationship of each device, based on the contents of the reception result database 130, the transmitter database 140, and the association database 150. In FIG. 15, the device correspondence information is represented in a table for easy description.

Further, in FIG. 15, when the discovered device has a signal intensity larger than a threshold, and an estimated distance from the wireless communication apparatus (corresponding to the first communication system) smaller than a threshold, the discovered device is marked with "O". Further, when the discovered device has a signal intensity less than the threshold, or an estimated distance from the wireless communication apparatus (corresponding to the first communication system) more than the threshold, the discovered device is marked with "Δ". Further, the device not discovered by the wireless communication apparatus (corresponding to the first communication system) is marked with "×".

For example, the wireless communication apparatuses (corresponding to the first communication system) which discover the same device from the devices not corresponding to the first communication system are presumed to be closer to each other. Such wireless communication apparatuses presumed to be closer to each other can be grouped into the same group. In such a manner, the wireless communication apparatus to be grouped can be determined, using the device correspondence information.

As described above, the control unit 120 can group the plurality of wireless communication apparatuses, based on the information about the signal intensity and the information about the estimated distance. The control unit 120 may group the plurality of wireless communication apparatuses, based on at least one of the information about the signal intensity and the information about the estimated distance. As described above, the control unit 120 can group the plurality of wireless communication apparatuses, using associated information (information of each database) of environmental information received from the wireless communication apparatus acquiring the environmental information, and the wireless communication apparatus transmitting the environmental information. That is, the control unit 120 can group the plurality of wireless communication apparatuses, using identification information of the first communication system and the another communication system of each wireless communication apparatus, and environmental information acquired by the another wireless communication apparatus discovering the wireless communication apparatus.

Further, a determination method for calculating the certainty of the group (evaluation value), and determining the group based on the certainty will be described below.

[Exemplary Calculation of Certainty of Group]

Here, a calculation method for the certainty of the group will be described.

The certainty of the group can be calculated using the following formula 1.

Certainty=(the number of transmitters discovered in common by the wireless communication apparatuses as the group candidate)+(the number of communication systems of the transmitters discovered by the wireless communication apparatuses as the group candidate)−(the number of transmitters from which each of the wireless communication apparatuses as the group candidate receives signals having a strength(signal intensity)lower than the threshold)−1    formula 1

Here, 1 is subtracted from the formula 1, only when some wireless communication apparatuses as the group candidate are separated from the other wireless communication apparatuses by the threshold or more. For example, it can be determined whether the some wireless communication apparatuses as the group candidate are separated from the other wireless communication apparatuses by the threshold or more based on the absolute positional information of the wireless communication apparatuses.

Exemplary calculation of the certainty of the group exemplified in FIG. 15 will be described using the formula 1. In addition, an example of using a value of approximately 5 to 7 will be described as the threshold for determining the group. Here, examples of calculating the certainty of the wireless communication apparatuses 202 to 204, the certainty of the wireless communication apparatuses 201 and 202, and the certainty of the wireless communication apparatuses 204 and 205 will be described.

Certainty of the wireless communication apparatuses 202 to 204=6(the number of discovered transmitters)+3(the number of communication systems)−0(the number of transmitters having a weak signal intensity)=9

Certainty of the wireless communication apparatuses 201 and 202=7(the number of discovered transmitters)+2(the number of communication systems)−7(the number of transmitters having a weak signal intensity)=2

Certainty of the wireless communication apparatuses 204 and 205=5(the number of discovered transmitters)+3(the number of communication systems)−5(the number of transmitters having a weak signal intensity)−1(since the wireless communication apparatuses 204 and 205 are separated from each other)=2

As described above, the value (9) of the certainty of the wireless communication apparatuses 202 to 204 is equal to or more than the threshold, so that the wireless communication apparatuses 202 to 204 are determined to be grouped.

Further, for example, the transmitters (information processing apparatus 100, electronic devices 211 to 216, 221, and 222) using the three different communication systems (first communication system, second communication system, third communication system) are discovered by the wireless communication apparatuses 202 to 204. Therefore, it can be presumed that the wireless communication apparatuses 202 to 204 are not only close to each other in distance but also resemble in signal environment.

On the other hand, the value (2) of the certainty of the wireless communication apparatuses 201 and 202, and the value (2) of the certainty of the wireless communication apparatuses 204 and 205 are less than the threshold. Therefore, the wireless communication apparatuses 201 and 202, and the wireless communication apparatuses 204 and 205 are not grouped.

For example, as illustrated in FIG. 1, since the obstruction 20 exists between the wireless communication apparatus 201 and 202, the wireless communication apparatuses do not have a similar signal reception environment.

Further, for example, as illustrated in FIG. 15, the wireless communication apparatus 201 receives the signals from the electronic devices 214 and 215, and the wireless communication apparatus 202, and the signals have an intensity less than the threshold.

Further, the wireless communication apparatus 202 receives the signals from the electronic devices 211 to 213, and the wireless communication apparatus 201, and the signals have an intensity less than the threshold. Further, the electronic devices 221 and 222 are discovered by the wireless communication apparatus 202, but not discovered by the wireless communication apparatus 201.

Further, the transmitters (information processing apparatus 100, electronic devices 211 to 216, 221, and 222) using the three different communication systems (first communication system, second communication system, third communication system) are discovered by both of the wireless communication apparatuses 204 and 205. However, both of the wireless communication apparatuses 204 and 205 are slightly separated. Further, the wireless communication apparatus 204 receives the signals of the wireless communication apparatus 202, the electronic device 216, and the electronic device 222, and the signals have an intensity more than the threshold. In contrast, the wireless communication apparatus 205 receives the signals of the wireless communication apparatus 202, the electronic device 216, and the electronic device 222, and the signals have an intensity less than the threshold.

As described above, the control unit 120 of the information processing apparatus 100 generates device correspondence information representing a correspondence relationship between the devices based on the contents of the reception result database 130, the transmitter database 140, and the association database 150. The control unit 120 can group each of the wireless communication apparatuses based on the generated device correspondence information.

That is, the control unit 120 calculates the evaluation value of the group candidate based on the number of electronic devices discovered in common by the wireless communication apparatuses as the group candidate, the number of communication systems of the discovered electronic devices, and the signal intensities of the discovered electronic devices. The control unit 120 can determine whether the group candidate is grouped, based on the calculated evaluation value.

Further, the control unit 120 can select the representative terminal from the plurality of wireless communication apparatuses belonging to the group. For example, the information processing apparatus 100 can measure the received power, when receiving the report of the perimeter monitoring from each of the wireless communication apparatuses. The control unit 120 can select the representative terminal from the plurality of wireless communication apparatuses belonging to the group, based on the measured received power.

For example, the wireless communication apparatus having the highest measured received power can be selected as the representative terminal, from the plurality of wireless communication apparatuses belonging to the group. Further, for example, the wireless communication apparatus having the lowest measured received power can be selected as the representative terminal, from the plurality of wireless communication apparatuses belonging to the group.

Further, for example, the wireless communication apparatus having a measured received power closest to an average (average of the received power of the plurality of wireless communication apparatuses) can be selected as the representative terminal, from the plurality of wireless communication apparatuses belonging to the group.

As described above, the representative terminal can be selected from the plurality of wireless communication apparatuses belonging to the group. For example, the control unit 120 of the information processing apparatus 100 can give an instruction to return an acknowledgement in response to a multicast packet to the representative terminal. Therefore, the number of acknowledgments can be reduced, and a radio resource can be effectively used.

Further, the representative terminal may be selected by a method other than the method using the received power. For example, the representative terminal can be selected from the plurality of wireless communication apparatuses belonging to the group, based on the number of transmitters discovered by the plurality of wireless communication apparatuses belonging to the group. For example, the wireless communication apparatus discovering the largest number of transmitters can be selected as the representative terminal. Further, for example, the wireless communication apparatus discovering the smallest number of transmitters can be selected as the representative terminal. Further, for example, the wireless communication apparatus discovering the transmitters having the number closest to an average value, can be selected as the representative terminal.

Further, for example, the representative terminal can be selected from the plurality of wireless communication apparatuses belonging to the group, based on the number of groups including the plurality of wireless communication apparatuses. For example, the wireless communication apparatus belonging to the largest number of groups can be selected as the representative terminal. Further, for example, the wireless communication apparatus belonging to the smallest number of groups can be selected as the representative terminal. Further, for example, the wireless communication apparatus belonging to the groups having the number closest to an average value, can be selected as the representative terminal.

As described above, the control unit 120 of the information processing apparatus 100 can select, for each group, the representative terminal from among the wireless communication apparatuses grouped into the same group. Further, the control unit 120 can receive the acknowledgment only from the representative terminal, when the multicast transmission is performed for the wireless communication apparatuses connected to the information processing apparatus 100.

Further, the control unit 120 can perform retransmission using the modulation and error correction coding according to the group including the wireless communication apparatuses when a retransmission request for the multicast transmission is received from a wireless communication apparatus.

[Exemplary Operation of Information Processing Apparatus]

Figure 16:
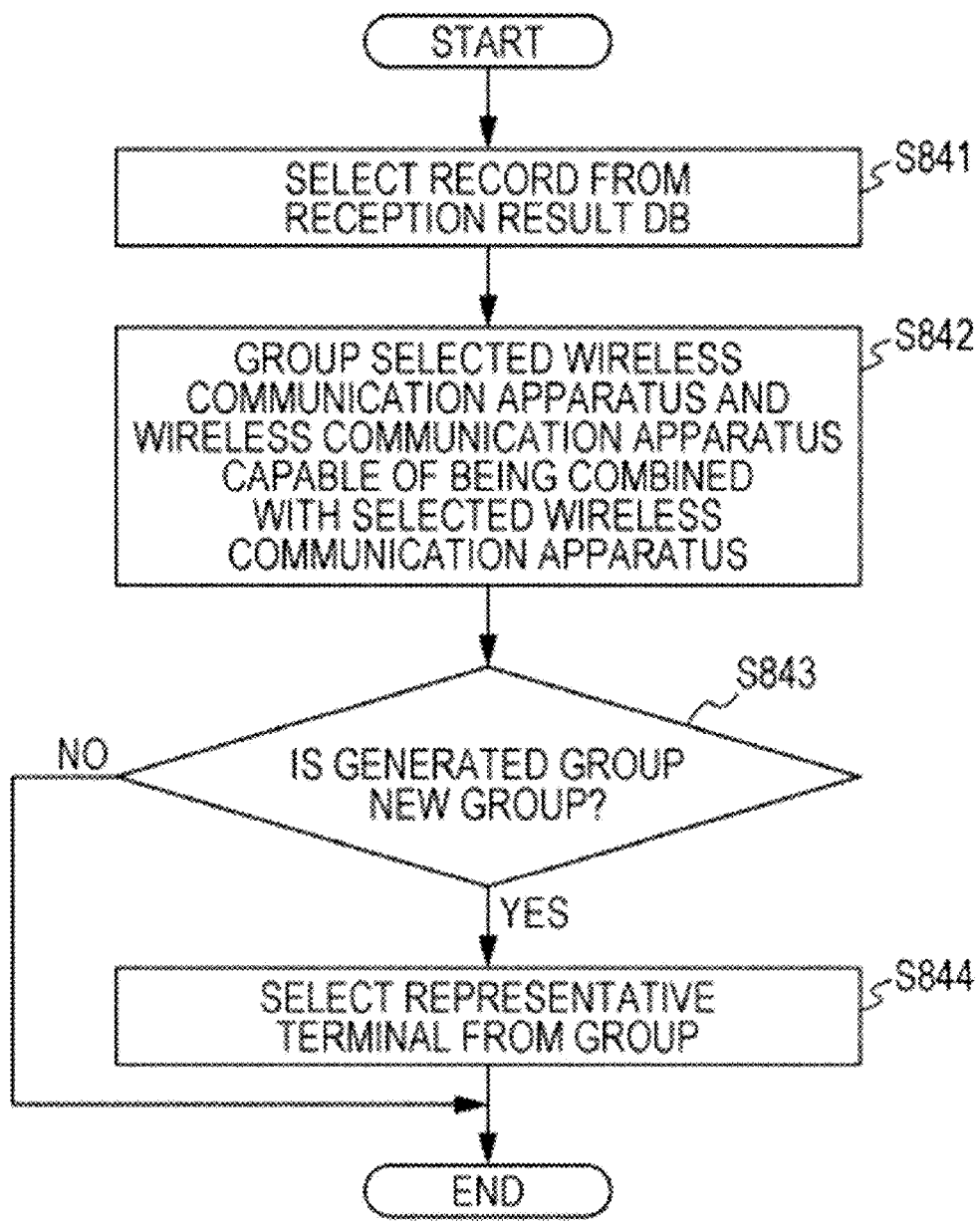
FIG. 16 is a flowchart illustrating an exemplary procedure of a group forming process by the information processing apparatus 100 according to the embodiment of the present technology.

FIG. 16 is a flowchart illustrating an exemplary procedure of a group forming process by the information processing apparatus 100 according to the embodiment of the present technology.

First, the control unit 120 selects one record from the reception result database 130 (step S841). Subsequently, the control unit 120 extracts the wireless communication apparatus capable of being combined with the wireless communication apparatus corresponding to the selected record, and groups the wireless communication apparatuses (step S842). For example, the control unit 120 can extract the wireless communication apparatus capable of being combined with the wireless communication apparatus corresponding to the record, using the device correspondence information illustrated in FIG. 15. For example, each combination is calculated for the certainty of the group using the formula 1, and the wireless communication apparatuses constituting a combination having a certainty equal to or larger than the threshold are grouped into one group. It is to be understood that the step S842 represents one example of the procedure for grouping described in the scope of the claims.

Subsequently, the control unit 120 determines whether the generated group is a new group (step S843). When the generated group is not a new group (step S843), selection of the representative terminal has been made from the group, therefore operation of the group forming process is ended.

When the generated group is a new group (step S843), the control unit 120 selects the representative terminal of the group (step S844). For example, the representative terminal can be selected based on the measured received power. Further, thus generated information about the group (unique identifier of the wireless communication apparatus, representative terminal, group score) are stored in each database (group database 160, group score database 170).

[Exemplary Calculation of Certainty of Group]

Next, another calculation method for the certainty of the group will be described.

First, an example of the calculation method for the certainty of the group will be described using the received power. For example, an average of the received power per one transmitter/one receiver of the group candidate is derived, and the certainty of the group can be calculated based on the average. A larger value of the certainty should be assumed to have an increased reliability.

Specifically, the following formula 2 is used to calculate the certainty of the group.

Certainty=(the sum of the received power of the wireless communication apparatuses as the group candidate)/(the number of transmitters discovered in common by the wireless communication apparatuses as the group candidate)/ (the number of wireless communication apparatuses as the group candidate)   formula 2

For example, when the communication system employs the wireless LAN, Bluetooth, or the like, a bit error rate (e.g., bit error rate before/after error correction processing) or the like may be used in place of the received power in formula 2.

In addition, for example, when an optical communication system is employed, an intensity, a quantity, brightness, or a density can be used in place of the received power in formula 2. In addition, for example, when an acoustic communication system is employed, an energy quantity or a sound pressure can be used in place of the received power in formula 2.

As described above, the control unit 120 can calculate the evaluation value of the group candidate (certainty), based on the sum of the received power of the wireless communication apparatuses as the group candidate, the number of electronic devices discovered in common by the wireless communication apparatuses as the group candidate, and the number of wireless communication apparatuses. The control unit 120 can determine whether the group candidate is grouped, based on the calculated evaluation value.

Next, an example of the calculation method for the certainty of the group, using the estimated distance from the transmitter. For example, an average of the estimated distance per one transmitter/one receiver of the group candidate is derived, and the certainty of the group can be calculated based on the average. A smaller value of the certainty should be assumed to have an increased reliability.

Specifically, the following formula 3 is used to calculate the certainty of the group.

Certainty=(the sum of estimated distances from the wireless communication apparatuses as the group candidate to the transmitters)/(the number of transmitters discovered in common by the wireless communication apparatuses as the group candidate)/(the number of wireless communication apparatuses as the group candidate)   formula 3

As described above, when the estimated distance from the transmitter is used, it is assumed that the communication systems have different signal transmission distances. However, it is commonly recognized that a distance closer to the transmitter is more reliable. In response to that, an average of the estimated distance per one transmitter/one receiver is derived for each group candidate, regardless of the communication system. Therefore, it can be considered that a smaller average has an increased reliability.

As described above, the control unit 120 calculates the evaluation value of the group candidate (certainty), based on the sum of the estimated distances to the electronic devices from the wireless communication apparatuses as the group candidate, the number of electronic devices discovered in common by the wireless communication apparatuses as the group candidate, and the number of wireless communication apparatuses. The control unit 120 can determine whether the group candidate is grouped, based on the calculated evaluation value.

When formulas 2 and 3 are used to calculate the certainty of the group, different indexes of the certainty may be used according to the communication system.

Further, fixation information (e.g., fixation 336 illustrated in FIG. 3) or the absolute positional information of the transmitter may be used to calculate the certainty of the group. For example, when the absolute positional information of the transmitter can be acquired, and fixation of the transmitter is detected, a predetermined value (e.g., 2 or 3) may be added upon calculation of the certainty of the group, in order to represent a "reliable transmitter". On the other hand, when the transmitter is not fixed (i.e., movable body), a predetermined value (e.g., 2 or 3) may be subtracted upon calculation of the certainty of the group, in order to represent an "unreliable transmitter".

As described above, in the embodiment of the present technology, received information of a plurality of signal sources having different communication systems (wireless communication apparatuses, transmitters) is collected from the wireless communication apparatus, and the received information is used to group the wireless communication apparatus. As described above, the received information of the plurality of signal sources having different communication systems can be used to group the wireless communication apparatus not only physically closer in distance but also having a similar signal environment. Therefore, the grouping of the wireless communication apparatus for multicast transmission can be appropriately performed.

Further, in the embodiment of the present technology, the acknowledgment is necessary only from the representative terminal of the group upon multicast transmission, and therefore the acknowledgment from the other wireless communication apparatuses in the group can be omitted. That is, in the multicast transmission, the number of terminals returning the acknowledgment (ACK) can be reduced. Therefore, the network congestion can be reduced.

Further, the information processing apparatus 100 can perform retransmission not using unicast in response to the retransmission request from the wireless communication apparatus, but using multicast to the group to which the wireless communication apparatus belongs. Therefore, the network congestion can be reduced.

Further, the absolute positional information (e.g., absolute positional information 144 illustrated in FIG. 11) may be used for retransmission processing. For example, when the retransmission processing is performed for the group, radio waves can be concentrated in a direction specified by the absolute positional information (i.e., beam forming technology) to increase the efficiency of the retransmission processing.

Further, information processing apparatus 100 specifies the group including the representative apparatus belongs as an address of a frame requested to be retransmitted in response to the retransmission request from the representative terminal in the group, and performs retransmission using modulation and error correction coding suitable for the group. Therefore, individual retransmission to the wireless communication apparatuses belonging to the group does not need to be performed, and the network congestion can be reduced.

As described above, in the embodiment of the present technology, the wireless communication apparatus can be appropriately grouped, using the distance and the signal intensity about a signal transmitter other than the information processing apparatus 100. For example, when the obstruction does not exist between the information processing apparatus 100 and the wireless communication apparatus, but exists between the wireless communication apparatuses, the wireless communication apparatuses are separately grouped.

In the embodiment of the present technology, an example of the determination of the grouping by the information processing apparatus 100 has been described, but the wireless communication apparatus may determine the grouping. For example, the wireless communication apparatus can acquire the contents of each database held by the information processing apparatus 100, from the information processing apparatus 100 to determine the grouping based on the contents. Further, the wireless communication apparatus can hold the database corresponding to each database held by the information processing apparatus 100, by itself, and determine the grouping based on the held database. In this configuration, information to be stored in the database held by itself needs to be acquired from the information processing apparatus 100 or the other wireless communication apparatuses.

In the embodiment of the present technology, as a connection mode of the wireless network, an example of the network has been described which includes the information processing apparatus 100 (access point) functioning as a master, and the wireless communication apparatuses 201 to 205 (functioning as a slave) connected to the information processing apparatus 100. However, the connection mode of the wireless network is not intended to be limited to the configurations having been described above. For example, the embodiment of the present technology can be applied also to a connection mode called a mesh network constructed by directly connecting the wireless communication apparatuses. In this configuration, at least one of the wireless communication apparatuses functions as a master in order to, for example, request and receive perimeter monitoring report, group each wireless communication apparatus, calculate the certainty of the group, and select the representative apparatus. Further, each processing may be wholly performed by one wireless communication apparatus, or may be performed by the plurality of wireless communication apparatuses.

In addition, the embodiment of the present technology can be also applied to grouping of the wireless communication apparatuses in an overlapping basic service set (OBSS) environment. An example of the grouping in the OBSS environment will be illustrated in FIG. 17.

[Exemplary Configuration of Communication System]

Figure 17:
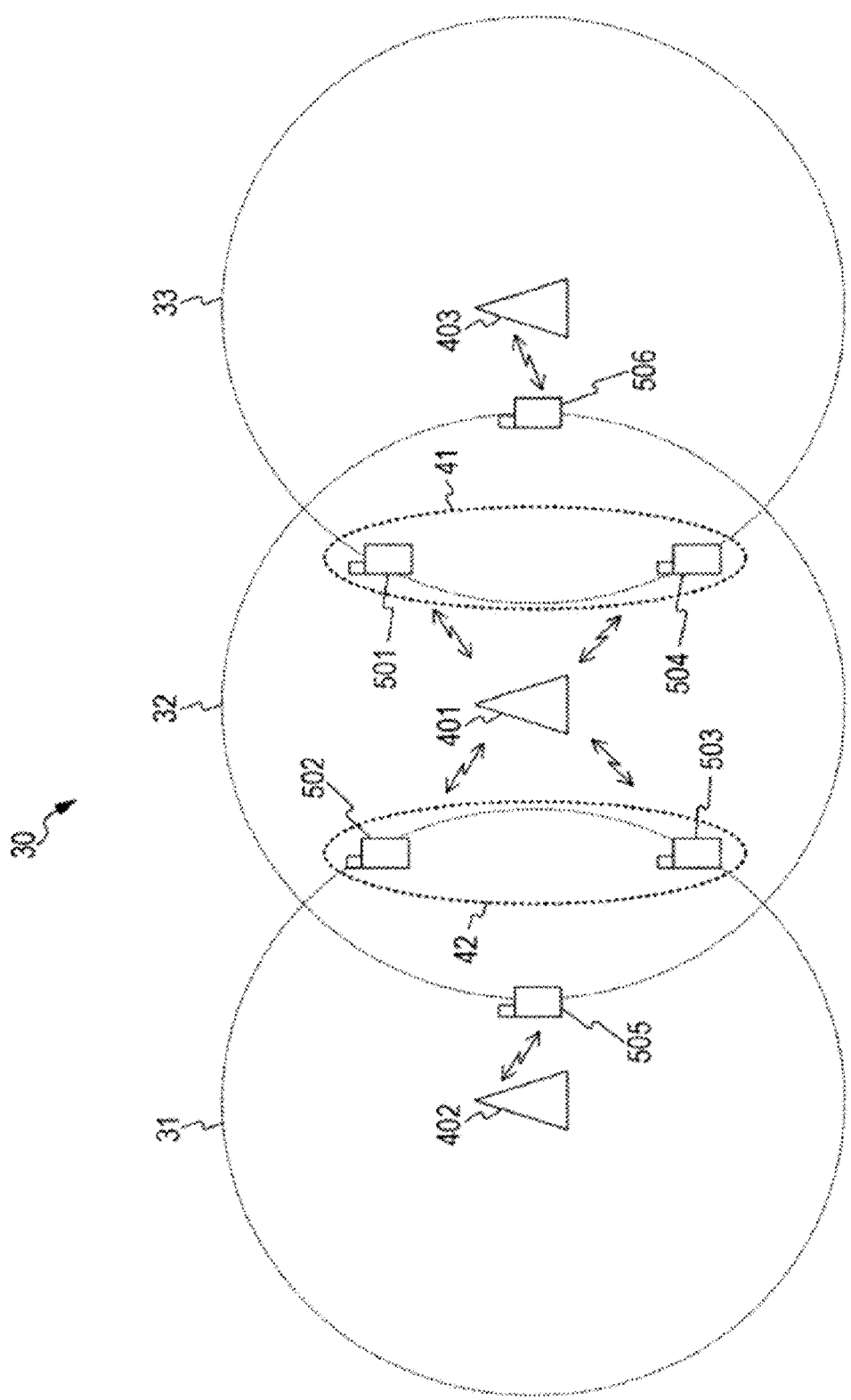
FIG. 17 is a diagram illustrating an exemplary system configuration of a communication system 30 according to the embodiment of the present technology.

FIG. 17 is a diagram illustrating an exemplary system configuration of a communication system 30 according to the embodiment of the present technology. FIG. 17 mainly illustrates an example of a connection mode of the wireless network.

The communication system 30 includes information processing apparatuses 401 to 403 and wireless communication apparatuses 501 to 506. It is noted that the information processing apparatuses 401 to 403 correspond to the information processing apparatus 100 illustrated in FIG. 1 or the like. Further, the wireless communication apparatuses 501 to 506 correspond to the wireless communication apparatuses 201 to 205 illustrated in FIG. 1 or the like.

Further, in FIG. 17, a range of direct communication of the information processing apparatus 401 using the wireless communication is expressed as an information transmission range 32. The information transmission range 32 represents an information transmission range (service range) based on the information processing apparatus 401. Similarly, in FIG. 17, a range of direct communication of the information processing apparatus 402 using the wireless communication is expressed as an information transmission range 31, and a range of direct communication of the information processing apparatus 403 using the wireless communication is expressed as an information transmission range 33.

For example, the information processing apparatus 401 is connected with the wireless communication apparatuses 501 to 504, the information processing apparatus 402 is connected with the wireless communication apparatus 505, and the information processing apparatus 403 is connected with the wireless communication apparatus 506.

Further, the wireless communication apparatuses 502 and 503 are within the information transmission range 31, and can receive a signal (e.g., beacon) from the information processing apparatus 402. In addition, the wireless communication apparatuses 501 and 504 are within the information transmission range 33, and can receive a signal (e.g., beacon) from the information processing apparatus 403.

The wireless communication apparatuses 502 and 503 can receive a signal from the wireless communication apparatus 505. The wireless communication apparatuses 501 and 504 can receive a signal from the wireless communication apparatus 506.

In such a configuration, when the wireless communication apparatus 502 receives the signal (e.g., beacon) from the information processing apparatus 402 other than the information processing apparatus 401 to which the apparatus itself is connected, the wireless communication apparatus 502 records information about the information processing apparatus 402 in the discovered-device database. The discovered-device database corresponds to the discovered-device database 330 illustrated in FIG. 3. The wireless communication apparatus 502 transmits and reports the contents of the discovered-device database to the information processing apparatus 401 to which the apparatus itself is connected. As described above, the wireless communication apparatus 502 receives the signal (e.g., beacon) from the information processing apparatus 402 other than the information processing apparatus 401 to which the apparatus itself is connected, and reports the radio field intensity or the like of the received signal to the information processing apparatus 401 to which the apparatus itself is connected.

Similarly, the wireless communication apparatus 503 receives the signal (e.g., beacon) from the information processing apparatus 402 other than the information processing apparatus 401 to which the apparatus itself is connected, and reports the radio field intensity or the like of the received signal to the information processing apparatus 401 to which the apparatus itself is connected.

Similarly, each of the wireless communication apparatuses 501 and 504 receives the signal (e.g., beacon) from the information processing apparatus 403 other than the information processing apparatus 401 to which the apparatus itself is connected, and reports the radio field intensity or the like of the received signal to the information processing apparatus 401 to which the apparatus itself is connected.

Further, when the wireless communication apparatus 502 receives the signal from the wireless communication apparatus 505 connected to the information processing apparatus 402 other than the information processing apparatus 401 to which the apparatus itself is connected, the wireless communication apparatus 502 records information about the wireless communication apparatus 505 in the discovered-device database. The discovered-device database corresponds to the discovered-device database 330 illustrated in FIG. 3. The wireless communication apparatus 502 transmits and reports the contents of the discovered-device database to the information processing apparatus 401 to which the apparatus itself is connected. As described above, the wireless communication apparatus 502 receives the signal from the wireless communication apparatus 505 connected to the information processing apparatus 402 other than the information processing apparatus 401 to which the apparatus itself is connected, and reports the radio field intensity or the like of the received signal to the information processing apparatus 401 to which the apparatus itself is connected.

Similarly, the wireless communication apparatus 503 receives the signal from the wireless communication apparatus 505 connected to the information processing apparatus 402 other than the information processing apparatus 401 to which the apparatus itself is connected, and reports the radio field intensity or the like of the received signal to the information processing apparatus 401 to which the apparatus itself is connected.

Similarly, the wireless communication apparatuses 501 and 504 receives the signal from the wireless communication apparatus 506 connected to the information processing apparatus 403 other than the information processing apparatus 401 to which the apparatus itself is connected, and reports the radio field intensity or the like of the received signal to the information processing apparatus 401 to which the apparatus itself is connected.

Further, each time the information processing apparatus 401 receives reports from the wireless communication apparatuses 501 to 504 connected to the apparatus itself, the information processing apparatus 401 records the contents of the report in a reception result database. The reception result database corresponds to the reception result database 130 illustrated in FIG. 10. The contents of the report recorded in the reception result database represent, for example, signal receiving conditions of the information processing apparatuses 402 and 403, and signal receiving conditions of the wireless communication apparatuses 505 and 506 connected to the information processing apparatuses 402 and 403. The information processing apparatus 401 groups the wireless communication apparatuses 501 to 504 connected to the apparatus itself, based on the recorded contents of the report.

For example, the information processing apparatus 401 can group apparatuses capable of receiving a signal (e.g., information processing apparatuses 402 and 403, wireless communication apparatuses 505 and 506) from a common apparatus, among the wireless communication apparatuses 501 to 504 connected to the apparatus itself. In this case, for example, only apparatuses receiving a signal having a high intensity based on a threshold can be employed to be grouped. Further, for example, only apparatuses having a closer distance between them (distance between any of wireless communication apparatuses 501 to 504, and any of wireless communication apparatuses 505 and 506 and information processing apparatuses 402 and 403) based on the threshold can be employed to be grouped.

For example, as represented by a dashed oval 42, the wireless communication apparatus 502 and the wireless communication apparatus 503 capable of receiving the signals from the information processing apparatus 402 and the wireless communication apparatus 505 can be grouped. Alternatively, for example, as represented by a dashed oval 41, the wireless communication apparatus 501 and the wireless communication apparatus 504 capable of receiving the signals from the information processing apparatus 403 and the wireless communication apparatus 506 can be grouped.

Further, for example, as described above, the certainty of a group may be calculated to determine the group based on the calculated certainty of the group. For example, as described above, the certainty of the group (evaluation value of the group candidate) is calculated to determine whether the group candidate is grouped, based on the calculated evaluation value of the group candidate.

As described above, the wireless communication apparatuses 501 to 504 use the first communication system to perform the wireless communication with the information processing apparatus 401. In this condition, the control unit (corresponding to the control unit 120 illustrated in FIG. 9) of the information processing apparatus 401 controls the grouping of the wireless communication apparatuses 501 to 504, with use of the first communication system, based on the environmental information about the first communication system acquired by each of the wireless communication apparatuses 501 to 504.

Here, the environmental information may include at least one of the information about signal intensity between the wireless communication apparatus (any of the wireless communication apparatuses 501 to 504), and the second information processing apparatus discovered by the wireless communication apparatus, using the first communication system, and the information about the distance between the wireless communication apparatus and the second information processing apparatus. Here, the second information processing apparatus represents the information processing apparatuses 402 or 403 different from the information processing apparatus 401 to which the wireless communication apparatuses 501 to 504 are connected (association), for example in the OBSS environment of a wireless LAN. In this configuration, the control unit of the information processing apparatus 401 can group the wireless communication apparatuses 501 to 504 based on at least one of the information about signal intensity and the information about the distance. For example, the control unit of the information processing apparatus 401 can group the wireless communication apparatuses 501 to 504 based on a result of comparison between the information about signal intensity and the threshold. Further, for example, the control unit of the information processing apparatus 401 can group the wireless communication apparatuses 501 to 504 based on a result of comparison between the information about the distance and the threshold.

Further, the environmental information may include at least one of the information about signal intensity between the wireless communication apparatus (any of the wireless communication apparatuses 501 to 504) and the second wireless communication apparatus discovered by the wireless communication apparatus, using the first communication system, and the information about the distance between the wireless communication apparatus and the second wireless communication apparatus. Here, the second wireless communication apparatus represents the wireless communication apparatuses 505 and 506 connected to the information processing apparatuses 402 and 403 different from the information processing apparatus 401 to which the wireless communication apparatuses 501 to 504 are connected (association), for example in the OBSS environment of the wireless LAN. In this configuration, the control unit of the information processing apparatus 401 can group the wireless communication apparatuses 501 to 504 based on at least one of the information about signal intensity and the information about the distance. For example, the control unit of the information processing apparatus 401 can group the wireless communication apparatuses 501 to 504 based on a result of comparison between the information about signal intensity and the threshold. Further, for example, the control unit of the information processing apparatus 401 can group the wireless communication apparatuses 501 to 504 based on a result of comparison between the information about the distance and the threshold.

2. Applications

A technology according to an embodiment of the present disclosure can be applied to various products. For example, the information processing apparatus 100, the wireless communication apparatuses 201 to 205, the electronic devices 211 to 216, the electronic devices 221 and 222 may be provided as a mobile terminal such as a smartphone, a tablet personal computer (PC), a notebook PC, portable game terminal, or a digital camera, a fixed terminal such as a TV receiver, a printer, a digital scanner, or a network storage, or an in-vehicle terminal such as a car navigation system. Further, the information processing apparatus 100, the wireless communication apparatuses 201 to 205, the electronic devices 211 to 216, the electronic devices 221 and 222 may be provided as a machine to machine (M2M) communication terminal (also referred to as a machine type communication (MTC) terminal) such as a smart meter, a vending machine, a remote monitoring system, or a point of sale (POS) terminal. Further, the information processing apparatus 100, the wireless communication apparatuses 201 to 205, the electronic devices 211 to 216, the electronic devices 221 and 222 may be a wireless communication module (e.g., integrated circuit module including one die) mounted to the terminals.

Meanwhile, for example, the information processing apparatus 100 may be provided as a wireless LAN access point (also referred to as radio base station) with or without a router function. Further, the information processing apparatus 100 may be provided as a mobile Wireless LAN router. Further, the information processing apparatus 100 may be a wireless communication module (e.g., integrated circuit module including one die) mounted to the terminals.

[2-1. First Application]

Figure 18:
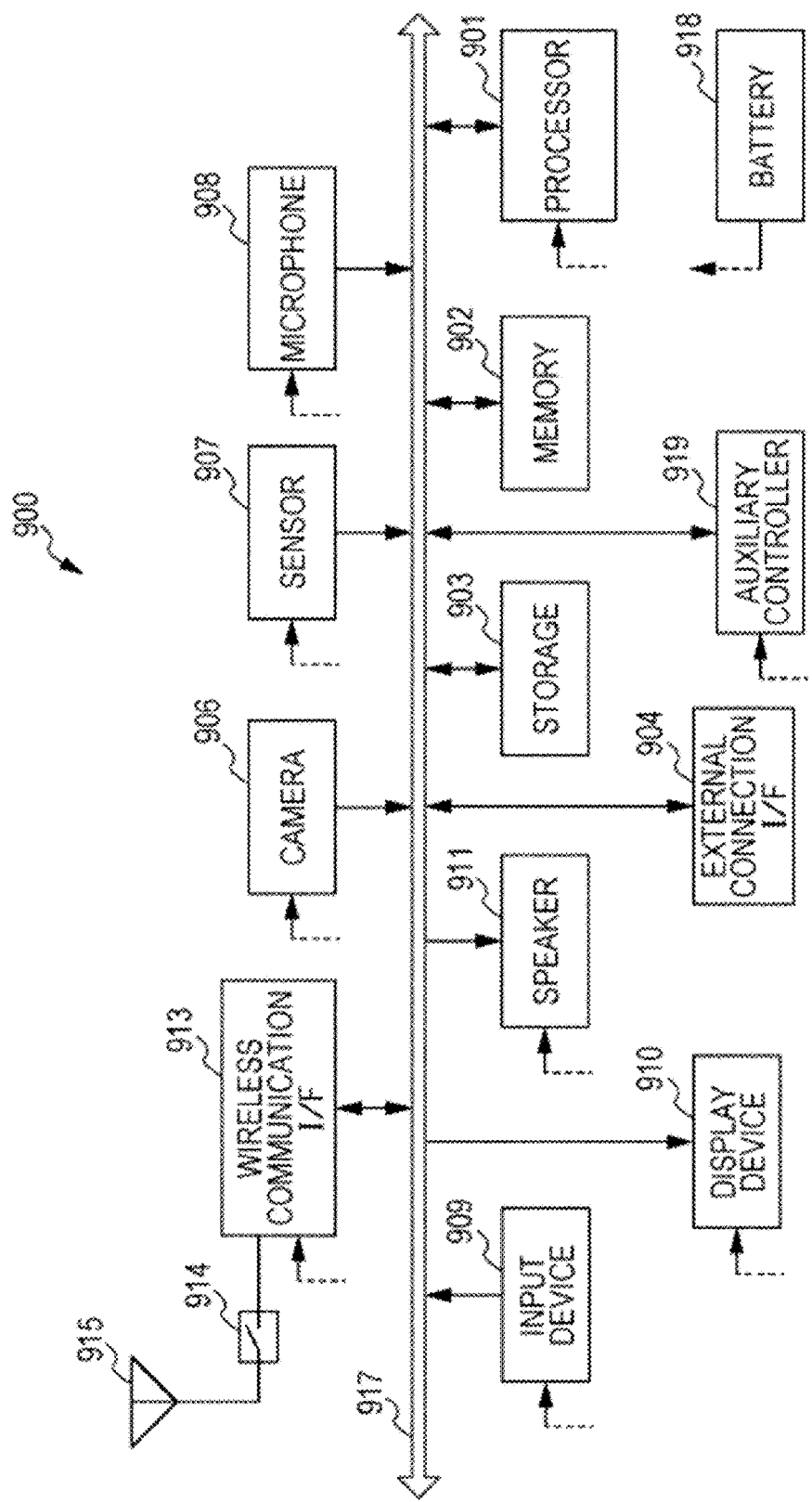
FIG. 18 is a block diagram illustrating an exemplary schematic configuration of a smartphone.

FIG. 18 is a block diagram illustrating an exemplary schematic configuration of a smartphone 900 to which a technology according to an embodiment of the present disclosure can be applied. The smartphone 900 includes a processor 901, a memory 902, storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be for example a central processing unit (CPU) or a system on chip (SoC), and controls the function of an application layer and the other layers of the smartphone 900. The memory 902 includes a random access memory (RAM) and a read only memory (ROM), and stores a program and data executed by the processor 901. The storage 903 can includes a storage medium such as a semiconductor memory or a hard disk. The external connection interface 904 is an interface for connecting an external device such as a memory card or a universal serial bus (USB) device to the smartphone 900.

The camera 906 includes for example, an imaging device such as a charge coupled device (CCD) or a complementary metal oxide semiconductor (CMOS), and generates a captured image. The sensor 907 can include for example, a sensor group such as a positioning sensor, a gyroscope, a magnetic field sensor, and an acceleration sensor. The microphone 908 converts sound input to the smartphone 900 to a sound signal. The input device 909 includes for example, a touch sensor, a keypad, a keyboard, a button, or a switch for detecting touch on a screen of the display device 910, and receives user's operation or information input. The display device 910 includes the screen of a liquid crystal display (LCD), an organic light emitting diode (OLED) display, or the like and displays an output image of the smartphone 900. The speaker 911 converts a sound signal output from the smartphone 900 to sound.

The wireless communication interface 913 supports at least one of wireless LAN standards such as IEEE802.11a, IEEE802.11b, IEEE802.11g, IEEE802.11n, IEEE802.11ac, and IEEE802.11ad, and performs wireless communication. The wireless communication interface 913 can communicate with another device through a wireless LAN access point, in an infrastructure mode. Further, the wireless communication interface 913 can directly communicate with another device in an ad hoc mode or a direct communication mode such as Wi-Fi Direct. In the Wi-Fi Direct, one of two terminals operates as an access point, but communication is directly performed between the terminals, unlike the ad hoc mode. The wireless communication interface 913 can typically include a base band processor, a radio frequency (RF) circuit, a power amplifier, and the like. The wireless communication interface 913 may be a one chip module in which a memory for storing a communication control program, a processor for performing the program, and an associated circuit are integrated. The wireless communication interface 913 may support another type of wireless communication system, such as a near field communication system, a close proximity wireless communication system, or a cellular communication system, in addition to the wireless LAN system. The antenna switch 914 switches connection destination of the antenna 915 between a plurality of circuits (e.g., circuit for different wireless communication systems) of the wireless communication interface 913. The antenna 915 includes a single or a plurality of antenna element (e.g., a plurality of antenna elements constituting a MIMO antenna), and is used for transmission and reception of a wireless signal by the wireless communication interface 913.

The smartphone 900 is not intended to be limited to the example of FIG. 18, and may include a plurality of antennas (e.g., antenna for wireless LAN, antenna for close proximity wireless communication system). In such a configuration, the antenna switch 914 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 913, and the auxiliary controller 919 with each other. The battery 918 supplies power to each block of the smartphone 900 illustrated in FIG. 18 through a power supply line partially illustrated by a broken line in FIG. 18. The auxiliary controller 919 operates the minimum functions of the smartphone 900, for example, in a sleep mode.

In the smartphone 900 illustrated in FIG. 18, the communication unit 310 and the control unit 320 having been described using FIG. 2, and the communication unit 110 and the control unit 120 having been described using FIG. 9 may be implemented in the wireless communication interface 913. Further, the functions may be at least partially implemented in the processor 901 or the auxiliary controller 919. For example, efficient use of the radio resource by grouping can reduce power consumption of the battery 918.

The smartphone 900 may operate as a wireless access point (software AP) by performance of an access point function by the processor 901 at an application level. Further, the wireless communication interface 913 may have a wireless access point function.

[2-2. Second Application]

Figure 19:
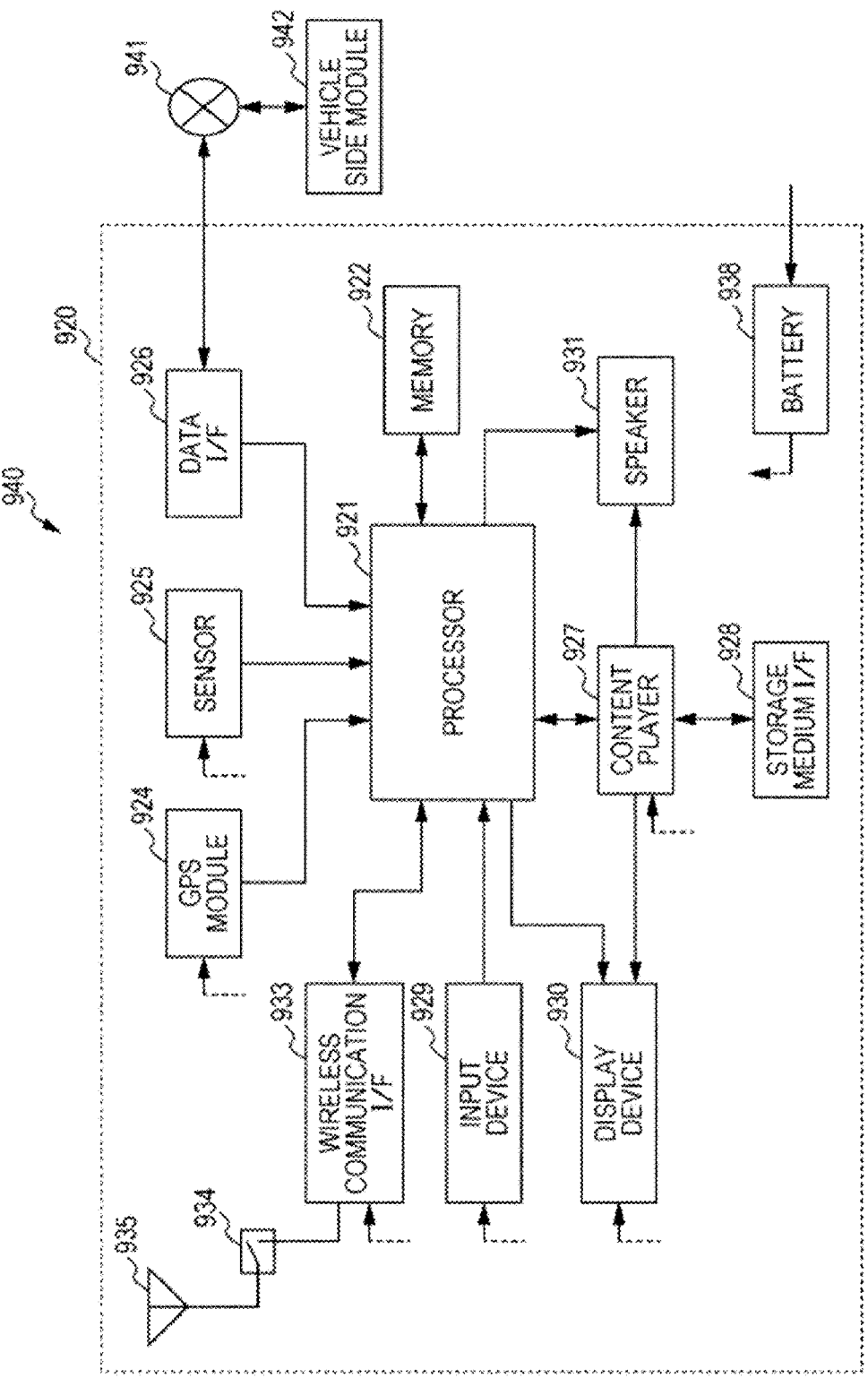
FIG. 19 is a block diagram illustrating an exemplary schematic configuration of a car navigation device.

FIG. 19 is a block diagram illustrating an exemplary schematic configuration of a car navigation device 920 to which a technology according to an embodiment of the present disclosure can be applied. The car navigation device 920 includes a processor 921, a memory 922, a global positioning system (GPS) module 924, a sensor 925, a data interface 926, content player 927, a storage medium interface 928, an input device 929, a display device 930, a speaker 931, a wireless communication interface 933, an antenna switch 934, an antenna 935, and a battery 938.

The processor 921 may be for example a CPU or a SoC, and controls a navigation function or the other functions of the car navigation device 920. The memory 922 includes a RAM and a ROM, and stores a program and data executed by the processor 921.

The GPS module 924 uses a GPS signal received from a GPS satellite to measure the position (e.g., latitude, longitude, altitude) of the car navigation device 920. The sensor 925 can include for example, a sensor group such as a gyroscope, a magnetic field sensor, and an air pressure sensor. The data interface 926 is connected to for example an in-vehicle network 941 through a terminal not illustrated, and acquires data, such as vehicle speed data, generated on the vehicle side.

The content player 927 reproduces content stored in a recording medium (e.g., CD or DVD) inserted into the storage medium interface 928. The input device 929 includes for example, a touch sensor, a button, or a switch for detecting touch on a screen of the display device 930, and receives user's operation or information input. The display device 930 includes the screen of an LCD, an OLED display, or the like, and displays a navigation function or a content image to be reproduced. The speaker 931 outputs navigation function or content sound to be reproduced.

The wireless communication interface 933 supports at least one of wireless LAN standards such as IEEE802.11a, IEEE802.11b, IEEE802.11g, IEEE802.11n, IEEE802.11ac, and IEEE802.11ad, and performs wireless communication. The wireless communication interface 933 can communicate with another device through a wireless LAN access point, in an infrastructure mode. Further, the wireless communication interface 933 can directly communicate with another device in an ad hoc mode or a direct communication mode such as Wi-Fi Direct. The wireless communication interface 933 can typically include a base band processor, an RF circuit, a power amplifier, and the like. The wireless communication interface 933 may be a one chip module in which a memory for storing a communication control program, a processor for performing the program, and an associated circuit are integrated. The wireless communication interface 933 may support another type of wireless communication system, such as a near field wireless communication system, a close proximity wireless communication system, or a cellular communication system, in addition to the wireless LAN system. The antenna switch 934 switches connection destination of the antenna 935 between a plurality of circuits of the wireless communication interface 933. The antenna 935 includes a single or a plurality of antenna element, and is used for transmission and reception of a wireless signal by the wireless communication interface 933.

The car navigation device 920 is not intended to be limited to the example of FIG. 19, and may include a plurality of antennas. In such a configuration, the antenna switch 934 may be omitted from the configuration of the car navigation device 920.

The battery 938 supplies power to each block of the car navigation device 920 illustrated in FIG. 19 through a power supply line partially illustrated by a broken line in FIG. 19. Further, the battery 938 accumulates power supplied from the vehicle side.

In the car navigation device 920 illustrated in FIG. 19, the communication unit 310 and the control unit 320 having been described using FIG. 2, and the communication unit 110 and the control unit 120 having been described using FIG. 9 may be implemented in the wireless communication interface 933. Further, the functions may be at least partially implemented in the processor 921.

Further, the wireless communication interface 933 operates as the information processing apparatus 100 having been described above, and may provide wireless connection to a terminal of a user in a vehicle.

Further, a technology according to an embodiment of the present disclosure may be provided as an in-vehicle system (or vehicle) 940 including one or more blocks of the above-mentioned car navigation device 920, the in-vehicle network 941, and a vehicle module 942. The vehicle module 942 generates vehicle data such as a vehicle speed, an engine speed, or failure information, and outputs the generated data to the in-vehicle network 941.

[2-3. Third Application]

FIG. 20 is a block diagram illustrating an exemplary schematic configuration of a wireless access point 950 to which a technology according to an embodiment of the present disclosure can be applied. The wireless access point 950 includes a controller 951, a memory 952, an input device 954, a display device 955, a network interface 957, a wireless communication interface 963, an antenna switch 964, and an antenna 965.

The controller 951 may be for example a CPU or a digital signal processor (DSP), and operates various functions of an Internet protocol (IP) layer and an upper layer of the wireless access point 950 (e.g., access restriction, routing, encryption, firewall, and log management). The memory 952 includes a RAM and a ROM, and stores a program executed by the controller 951, and various control data (e.g., terminal list, routing table, cryptographic key, security setting, log).

The input device 954 includes for example a button or a switch, and receives user's operation. The display device 955 includes an LED lamp or the like, and displays an operation status of the wireless access point 950.

The network interface 957 is a wired communication interface for connecting the wireless access point 950 to a wired communication network 958. The network interface 957 may have a plurality of connection terminals. The wired communication network 958 may be a LAN such as Ethernet (registered trademark), or may be a wide area network (WAN).

The wireless communication interface 963 supports at least one of wireless LAN standards such as IEEE802.11a, IEEE802.11b, IEEE802.11g, IEEE802.11n, IEEE802.11ac, and IEEE802.11ad, and provides wireless connection as an access point to a neighbor terminal. The wireless communication interface 963 can typically include a base band processor, an RF circuit, a power amplifier, and the like. The wireless communication interface 963 may be a one chip module in which a memory for storing a communication control program, a processor for performing the program, and an associated circuit are integrated. The antenna switch 964 switches connection destination of the antenna 965 between a plurality of circuits of the wireless communication interface 963. The antenna 965 includes a single or a plurality of antenna element, and is used for transmission and reception of a wireless signal by the wireless communication interface 963.

In the wireless access point 950 illustrated in FIG. 20, the communication unit 110 and the control unit 120 having been described using FIG. 9 may be implemented in the wireless communication interface 963. Further, the functions may be at least partially implemented in the controller 951.

It is noted that the embodiment shows an example for embodying the present technology, and matters in the embodiment and matters specifying the technology in the claims have a correspondence relationship. Similarly, matters specifying the technology in the claims, and matters in the embodiment of the present technology designated with the same name as those in the claims have a correspondence relationship. However, it should be understood that the present technology is not limited to the embodiment, but can be embodied with various modifications and alterations of the embodiment without departing from the spirit and scope of the present technology.

Further, the procedures having been described in the embodiment may be considered as a method having a series of the procedures, or may be provided as a program causing a computer to perform the series of the procedures or a recording medium storing the program. The recording medium may include, for example, a compact disc (CD), a mini disc (MD), a digital versatile disc (DVD), a memory card, or a Blu-ray (registered trademark) disc.

It should be understood that the effects having been described in the present specification are only examples, and the present technology may have another effect without being limited to them.

Further, the present technology may also have the following configuration.

Example (1)

An information processing apparatus configured to communicate with a first wireless communication apparatus via a first communication system, the information processing apparatus comprising control circuitry configured to: receive information relating to a second communication system discovered by the first wireless communication apparatus, the second communication system being different from the first communication system; and use the information relating to the second communication system to control grouping of a plurality of wireless communication apparatuses each configured to wirelessly communicate with the information processing apparatus using the first communication system, wherein the plurality of wireless communication apparatuses comprises the first wireless communication apparatus, and wherein controlling grouping of the plurality of wireless communication apparatuses comprising associating the first wireless communication apparatus with one or more second wireless communication apparatuses, wherein the one or more second wireless communication apparatuses are determined based at least in part on the information relating to the second communication system.

Example (2)

The information processing apparatus according to example (1), wherein the information relating to the second communication system includes at least one piece of information selected from a group consisting of: information about an intensity of a signal received from an electronic device discovered by the first wireless communication apparatus using the second communication system, and information about a distance between the electronic device and the first wireless communication apparatus, and the control circuitry is configured to group the plurality of wireless communication apparatuses based on the at least one piece of information.

Example (3)

The information processing apparatus according to any of the foregoing examples, wherein the information relating to the second communication system includes: identification information about an electronic device discovered by the first wireless communication apparatus using the second communication system or another communication system as a wireless communication system different from each of the first and second communication systems, and information about an intensity of a signal received from the electronic device, and wherein the control circuitry is configured to: calculate an evaluation value for a group candidate, based on a number of electronic devices discovered in common by one or more wireless communication apparatuses in the group candidate, a number of communication systems of the electronic devices discovered by the one or more wireless communication apparatuses in the group candidate, and respective signal intensities of the electronic devices discovered by the wireless communication apparatuses in the group candidate, and determine whether to define the group candidate as a group based on the evaluation value.

Example (4)

The information processing apparatus according to any of the foregoing examples, wherein the information relating to the second communication system includes: identification information about an electronic device discovered by the first wireless communication apparatus using the second communication system, and information about received power of the electronic device, and wherein the control circuitry is configured to: calculate an evaluation value for a group candidate based on a sum of received power of one or more wireless communication apparatuses in the group candidate, a number of electronic devices discovered in common by the one or more wireless communication apparatuses in the group candidate, and a number of wireless communication apparatuses in the group candidate, and determine whether to define the group candidate as a group based on the evaluation value.

Example (5)

The information processing apparatus according to any of the foregoing examples, wherein the information relating to the second communication system includes: identification information about an electronic device discovered by the first wireless communication apparatus using the second communication system, and information about an estimated distance from the first wireless communication apparatus to the electronic device, and wherein the control circuitry is configured to: calculate an evaluation value for a group candidate based on a sum of estimated distances from one or more wireless communication apparatuses in the group candidate to the electronic devices, a number of electronic devices discovered in common by the one or more wireless communication apparatuses in the group candidate, and a number of wireless communication apparatuses in the group candidate, and determine whether to define the group candidate as a group based on the evaluation value.

Example (6)

The information processing apparatus according to any of the foregoing examples, wherein the control circuitry is configured to: receive the information relating to the second communication system from the first wireless communication apparatus via the first communication system; and use association information between the information relating to the second communication system and the first wireless communication apparatus to control grouping of the plurality of wireless communication apparatuses.

Example (7)

The information processing apparatus according to any of the foregoing examples, wherein: the control circuitry is configured to receive the information relating to the second communication system from the first wireless communication apparatus via the first communication system; and the information relating to the second communication system comprises information about one or more electronic devices around the first wireless communication apparatus, the one or more electronic devices corresponding to the second communication system.

Example (8)

The information processing apparatus according to any of the foregoing examples, wherein: the control circuitry is configured to receive the information relating to the second communication system from the first wireless communication apparatus via the first communication system; and the information relating to the second communication system comprises identification information of an electronic device discovered by the first wireless communication apparatus using the second communication system, wherein the identification information is assigned by the second communication system, signal intensity about the electronic device, and a distance from the first wireless communication apparatus to the electronic device.

Example (9)

The information processing apparatus according to any of the foregoing examples, wherein: the control circuitry is configured to receive the information relating to the second communication system from the first wireless communication apparatus via the first communication system; and the information relating to the second communication system comprises first identification information for an electronic device in the first communication system, in association with second identification information for the electronic device in the second communication system.

Example (10)

The information processing apparatus according to any of the foregoing examples, wherein the control circuitry is configured to use first identification information of the first wireless communication apparatus in the first communication system, second identification information of the first wireless communication apparatus in the second communication systems, and information acquired by a third wireless communication apparatus discovering the first wireless communication apparatus to control grouping of the plurality of wireless communication apparatuses.

Example (11)

The information processing apparatus according to any of the foregoing examples, wherein the control circuitry is configured to select, for at least one group, a representative apparatus from wireless communication apparatuses grouped into the at least one group.

Example (12)

The information processing apparatus according to any of the foregoing examples, wherein the control circuitry is configured to receive acknowledgement only from the representative apparatus, upon multicast transmission to the wireless communication apparatuses connected to the information processing apparatus.

Example (13)

The information processing apparatus according to any of the foregoing examples, wherein when a retransmission request for multicast transmission is received from a third wireless communication apparatus, the control circuitry is configured to perform retransmission using modulation and error correction coding according to a group including the third wireless communication apparatus.

Example (14)

The information processing apparatus according to any of the foregoing examples, wherein the information relating to the second communication system comprises information acquired by the first wireless communication apparatus via a discovery procedure for the second communication system.

Example (15)

The information processing apparatus according to any of the foregoing examples, wherein the first communication system comprises a first Wi-Fi service set, and the second communication system comprises a second Wi-Fi service set different from the first Wi-Fi service set.

Example (16)

The information processing apparatus according to any of the foregoing examples, wherein the information relating to the second communication system comprises signal intensity information relating to at least one access point in the second Wi-Fi service set.

Example (17)

The information processing apparatus according to any of the foregoing examples, wherein the information relating to the second communication system comprises signal intensity information relating to at least one station in the second Wi-Fi service set.

Example (18)

The information processing apparatus according to any of the foregoing examples, wherein the first communication system uses a first networking technology, and the second communication system uses a second networking technology different from the first networking technology.

Example (19)

An information processing method comprising acts of: receiving, by an information processing apparatus configured to communicate with a first wireless communication apparatus via a first communication system, information relating to a second communication system discovered by the first wireless communication apparatus, the second communication system being different from the first communication system; and using the information relating to the second communication system to control grouping of a plurality of wireless communication apparatuses each configured to wirelessly communicate with the information processing apparatus using the first communication system, wherein the plurality of wireless communication apparatuses comprises the first wireless communication apparatus, and wherein controlling grouping of the plurality of wireless communication apparatuses comprises associating the first wireless communication apparatus with one or more second wireless communication apparatuses, wherein the one or more second wireless communication apparatuses are determined based at least in part on the information relating to the second communication system.

Example (20)

At least one non-transitory computer-readable medium having encoded thereon instructions which, when executed, cause a computer to perform a method comprising acts of: receiving, by an information processing apparatus configured to communicate with a first wireless communication apparatus via a first communication system, information relating to a second communication system discovered by the first wireless communication apparatus, the second communication system being different from the first communication system; and using the information relating to the second communication system to control grouping of a plurality of wireless communication apparatuses each configured to wirelessly communicate with the information processing apparatus using the first communication system, wherein the plurality of wireless communication apparatuses comprises the first wireless communication apparatus, and wherein controlling grouping of the plurality of wireless communication apparatuses comprises associating the first wireless communication apparatus with one or more second wireless communication apparatuses, wherein the one or more second wireless communication apparatuses are determined based at least in part on the information relating to the second communication system.

Example (21)

An information processing apparatus including a control unit configured to control grouping of a plurality of wireless communication apparatuses each configured to wirelessly communicate with the information processing apparatus using a first communication system, with use of a second communication system as a wireless communication system different from the first communication system, based on environmental information about the second communication system acquired by each of the plurality of wireless communication apparatuses.

Example (22)

The information processing apparatus according to any of the foregoing examples, wherein the environmental information includes at least one of information about signal intensity between an electronic device discovered by the wireless communication apparatus using the second communication system and the wireless communication apparatus, and information about the distance between the electronic device and the wireless communication apparatus, and the control unit groups the plurality of wireless communication apparatuses based on at least one of the information about the signal intensity and the information about the distance.

Examples (23)

The information processing apparatus according to any of the foregoing examples, wherein the environmental information includes identification information about the electronic device discovered by the wireless communication apparatus using the second communication system or another communication system as a wireless communication system different from any of the first and second communication systems, and the information about the signal intensity of the electronic device, and the control unit calculates an evaluation value of the group candidate, based on the number of electronic devices discovered in common by the wireless communication apparatuses as a group candidate, the number of communication systems of the electronic devices discovered by the wireless communication apparatuses as the group candidate, and the signal intensities of the electronic devices discovered by the wireless communication apparatuses as the group candidate, to determine whether to define the group candidate as a group based on the evaluation value.

Examples (24)

The information processing apparatus according to any of the foregoing examples, wherein the environmental information includes identification information about the electronic device discovered by the wireless communication apparatus using the second communication system, and information about received power of the electronic device, and the control unit calculates the evaluation value of the group candidate based on the sum of received power of the wireless communication apparatuses as the group candidate, the number of electronic devices discovered in common by the wireless communication apparatuses as the group candidate, and the number of wireless communication apparatuses as the group candidate, to determine whether to define the group candidate as a group based on the evaluation value.

Examples (25)

The information processing apparatus according to any of the foregoing examples, wherein the environmental information includes the identification information about the electronic device discovered by the wireless communication apparatus using the second communication system, and information about an estimated distance from the wireless communication apparatus to the electronic device, and the control unit calculates the evaluation value of the group candidate based on the sum of the estimated distances from the wireless communication apparatuses as the group candidate to the electronic devices, the number of electronic devices discovered in common by the wireless communication apparatuses as the group candidate, and the number of wireless communication apparatuses as the group candidate, to determine whether to define the group candidate as a group based on the evaluation value.

Examples (26)

The information processing apparatus according to any of the foregoing examples, wherein the information processing apparatus receives the environmental information from the wireless communication apparatus acquiring the environmental information, and the control unit uses associated information between the received environmental information and the wireless communication apparatus transmitting the environmental information to group the plurality of wireless communication apparatuses together.

Examples (27)

The information processing apparatus according to any of the foregoing examples, wherein the wireless communication apparatus acquires the environmental information about the electronic devices around the wireless communication apparatus, corresponding to the second communication system, and transmits the acquired environmental information to the information processing apparatus, using the first communication system.

Examples (28)

The information processing apparatus according to any of the foregoing examples, wherein the wireless communication apparatus acquires identification information of the electronic device discovered by the wireless communication apparatus using the second communication system, assigned by the second communication system, signal intensity about the electronic device, a distance from the wireless communication apparatus to the electronic device, estimated based on the signal intensity, as the environmental information about the electronic device, and transmits the acquired environmental information to the information processing apparatus, using the first communication system.

Examples (29)

The information processing apparatus according to any of the foregoing examples, wherein the wireless communication apparatus associates identification information in the first and second communication systems about the electronic device corresponding to the first and second communication systems around the wireless communication apparatus, with each other, and transmits the associated identification information about the electronic device to the information processing apparatus, using the first communication system.

Examples (30)

The information processing apparatus according to any of the foregoing examples, wherein the control unit uses identification information of the wireless communication apparatus in the first and second communication systems, and environmental information acquired by another wireless communication apparatus discovering the wireless communication apparatus to group the plurality of wireless communication apparatuses together.

Examples (31)

The information processing apparatus according to any of the foregoing examples, wherein the control unit selects, for each group, a representative apparatus from the wireless communication apparatuses grouped into the same group.

Examples (32)

The information processing apparatus according to any of the foregoing examples, wherein the control unit receives acknowledgement only from the representative apparatus, upon multicast transmission to the wireless communication apparatuses connected to the information processing apparatus.

Examples (33)

The information processing apparatus according to any of the foregoing examples, wherein when a retransmission request for multicast transmission is received from the wireless communication apparatus, the control unit performs retransmission using modulation and error correction coding according to a group including the wireless communication apparatus.

Examples (34)

An information processing apparatus including:
a control unit configured to control grouping of a plurality of wireless communication apparatuses each configured to wirelessly communicate with an information processing apparatus using a first communication system, with use of the first communication system, based on environmental information about the first communication system acquired by each of the plurality of wireless communication apparatuses.

Examples (35)

The information processing apparatus according to any of the foregoing examples, wherein the environmental information includes at least one of information about signal intensity between a second information processing apparatus and the wireless communication apparatus, and information about the distance between the second information processing apparatus and the wireless communication apparatus, the second information processing apparatus being an information processing apparatus discovered by the wireless communication apparatus using the first communication system, and different from the information processing apparatus connected with the wireless communication apparatus, the control unit grouping the plurality of wireless communication apparatuses based on at least one of the information about signal intensity and the information about the distance.

Examples (36)

The information processing apparatus according to any of the foregoing examples, wherein the environmental information includes at least one of information about signal intensity between the wireless communication apparatus and a second wireless communication apparatus, and information about the distance between the second wireless communication apparatus and the wireless communication apparatus, the second wireless communication apparatus being a wireless communication apparatus different from the wireless communication apparatus connected to the second information processing apparatus being an information processing apparatus discovered by the wireless communication apparatus using the first communication system, and different from the information processing apparatus, the control unit grouping the plurality of wireless communication apparatuses based on at least one of the information about signal intensity and the information about the distance.

Examples (37)

An information processing method including:
grouping a plurality of wireless communication apparatuses each configured to wirelessly communicate with an information processing apparatus using a first communication system, with use of a second communication system as a wireless communication system different from the first communication system, based on environmental information about the second communication system acquired by each of the plurality of wireless communication apparatuses.

Examples (38)

A program for causing a computer to perform a procedure of grouping a plurality of wireless communication apparatuses each configured to wirelessly communicate with an information processing apparatus using a first communication system, with use of a second communication system as a wireless communication system different from the first communication system, based on environmental information about the second communication system acquired by each of the plurality of wireless communication apparatuses.

REFERENCE SIGNS LIST

10 Communication system
20 Obstruction
100 Information processing apparatus
110 Communication unit
111 Antenna
120 Control unit
130 Reception result database
140 Transmitter database
150 Association database
160 Group database
170 Group score database
201 to 205 Wireless communication apparatuses
211 to 216, 221, 222 Electronic devices
310 Communication unit
311 Antenna
320 Control unit
330 Discovered-device database
340 Association database
900 Smartphone
901 Processor
902 Memory
903 Storage
904 External connection interface
906 Camera
907 Sensor
908 Microphone
909 Input device
910 Display device
911 Speaker
913 Wireless communication interface
914 Antenna switch
915 Antenna
917 Bus
918 Battery
919 Auxiliary controller
920 Car navigation device
921 Processor
922 Memory
924 GPS module
925 Sensor
926 Data interface
927 Content player
928 Storage medium interface
929 Input device
930 Display device
931 Speaker
933 Wireless communication interface
934 Antenna switch
935 Antenna
938 Battery 941 In-vehicle network
942 Vehicle module
950 Wireless access point
951 Controller
952 Memory
954 Input device
955 Display device
957 Network interface
958 Wired communication network
963 Wireless communication interface
964 Antenna switch
965 Antenna

The invention claimed is:

1. An information processing apparatus configured to communicate with a first wireless communication apparatus via a first communication network, the information processing apparatus comprising:
control circuitry configured to:
receive, from the first wireless communication apparatus, information relating to a second communication network discovered by the first wireless communication apparatus; and
use the information to associate the first wireless communication apparatus with one or more second wireless communication apparatuses, wherein the one or more second wireless communication apparatuses are determined based at least in part on the information relating to the second communication network,
wherein the information relating to the second communication network includes:
identification information about the one or more second wireless communication apparatuses discovered by the first wireless communication apparatus using the second communication network, and
power information about received power of the one or more second wireless communication apparatuses, and
wherein the control circuitry is configured to define a group candidate as a group based on the information.

2. The information processing apparatus according to claim 1,
wherein the information relating to the second communication network includes at least one piece of information selected from a group consisting of: information about an intensity of a signal received from an electronic device discovered by the first wireless communication apparatus using the second communication network, and information about a distance between the electronic device and the first wireless communication apparatus, and
the control circuitry is configured to group the plurality of wireless communication apparatuses based on the at least one piece of information.

3. The information processing apparatus according to claim 1,
wherein the information relating to the second communication network includes:
identification information about an electronic device discovered by the first wireless communication apparatus using the second communication network or another communication network as a wireless communication network different from each of the first and second communication networks, and
information about an intensity of a signal received from the electronic device, and wherein the control circuitry is configured to:
calculate an evaluation value for a group candidate, based on a number of electronic, devices discovered in common by one or more wireless communication apparatuses in the group candidate, a number of communication networks of the electronic devices discovered by the one or more wireless communication apparatuses in the group candidate, and respective signal intensities of the electronic devices discovered by the wireless communication apparatuses in the group candidate, and
determine whether to define the group candidate as a group based on the evaluation value.

4. The information processing apparatus according to claim 1,
wherein the control circuitry is configured to:
calculate an evaluation value for a group candidate based on a sum of received power of one or more wireless communication apparatuses in the group candidate, a number of electronic devices discovered in common by the one or more wireless communication apparatuses in the group candidate, and a number of wireless communication apparatuses in the group candidate, and
determine whether to define the group candidate as a group based on the evaluation value.

5. The information processing apparatus according to claim 1,
wherein the information relating to the second communication network includes:
identification information about an electronic device discovered by the first wireless communication apparatus using the second communication network, and
information about an estimated distance from the first wireless communication apparatus to the electronic device, and
wherein the control circuitry is configured to:
calculate an evaluation value for a group candidate based on a sum of estimated distances from one or more wireless communication apparatuses in the group candidate to the electronic devices, a number of electronic devices discovered in common by the one or more wireless communication apparatuses in the group candidate, and a number of wireless communication apparatuses in the group candidate, and
determine whether to define the group candidate as a group based on the evaluation value.

6. The information processing apparatus according to claim 1, wherein the control circuitry is configured to:
receive the information relating to the second communication network from the first wireless communication apparatus via the first communication network; and
use association information between the information relating to the second communication network and the first wireless communication apparatus to control grouping of the plurality of wireless communication apparatuses.

7. The information processing apparatus according to claim 1, wherein:
the control circuitry is configured to receive the information relating to the second communication network from the first wireless communication apparatus via the first communication network; and
the information relating to the second communication network comprises information about one or more electronic devices around the first wireless communication apparatus, the one or more electronic devices corresponding to the second communication network.

8. The information processing apparatus according to claim 1, wherein:
the control circuitry is configured to receive the information relating to the second communication network from the first wireless communication apparatus via the first communication network; and the information relating to the second communication network comprises identification information of an electronic device discovered by the first wireless communication apparatus using the second communication network, wherein the identification information is assigned by the second communication network, signal intensity about the electronic device, and a distance from the first wireless communication apparatus to the electronic device.

9. The information processing apparatus according to claim 1, wherein:

the control circuitry is configured to receive the information relating to the second communication network from the first wireless communication apparatus via the first communication network; and the information relating to the second communication network comprises first identification information for an electronic device in the first communication network, in association with second identification information for the electronic device in the second communication network.

10. The information processing apparatus according to claim 1, wherein the control circuitry is configured to use first identification information of the first wireless communication apparatus in the first communication network, second identification information of the first wireless communication apparatus in the second communication network, and information acquired by a third wireless communication apparatus discovering the first wireless communication apparatus to control grouping of the plurality of wireless communication apparatuses.

11. The information processing apparatus according to claim 1, wherein the control circuitry is configured to select, for at least one group, a representative apparatus from wireless communication apparatuses grouped into the at least one group.

12. The information processing apparatus according to claim 11, wherein the control circuitry is configured to receive acknowledgement only from the representative apparatus, upon multicast transmission to the wireless communication apparatuses connected to the information processing apparatus.

13. The information processing apparatus according to claim 1, wherein when a retransmission request for multicast transmission is received from a third wireless communication apparatus, the control circuitry is configured to perform retransmission using modulation and error correction coding according to a group including the third wireless communication apparatus.

14. The information processing apparatus according to claim 1, wherein the information relating to the second communication network comprises information acquired by the first wireless communication apparatus via a discovery procedure for the second communication network.

15. The information processing apparatus according to claim 1, wherein the first communication network comprises a first Wi-Fi service set, and the second communication network comprises a second Wi-Fi service set different from the first Wi-Fi service set.

16. The information processing apparatus according to claim 15, wherein the information relating to the second communication network comprises signal intensity information relating to at least one access point in the second Wi-Fi service set.

17. The information processing apparatus according to claim 15, wherein the information relating to the second communication network comprises signal intensity information relating to at least one station in the second Wi-Fi service set.

18. The information processing apparatus according to claim 1, wherein the first communication network uses a first networking technology, and the second communication network uses a second networking technology different from the first networking technology.

19. An information processing method comprising acts of:

receiving, by an information processing apparatus configured to communicate with a first wireless communication apparatus via a first communication network, information relating to a second communication network discovered by the first wireless communication apparatus, the information relating to the second communication network being received from the first wireless communication apparatus; and using the information to associate the first wireless communication apparatus with one or more second wireless communication apparatuses, wherein the one or more second wireless communication apparatuses are determined based at least in part on the information relating to the second communication network, wherein the information relating to the second communication network includes:

identification information about the one or more second wireless communication apparatuses discovered by the first wireless communication apparatus using the second communication network, and power information about received power of the one or more second wireless communication apparatuses, and wherein the control circuitry is configured to define a group candidate as a group based on the information.

20. At least one non-transitory computer-readable medium having encoded thereon instructions which, when executed, cause a computer to perform a method comprising acts of:

receiving, by an information processing apparatus configured to communicate with a first wireless communication apparatus via a first communication network, information relating to a second communication network discovered by the first wireless communication apparatus, the information relating to the second communication network being received from the first wireless communication apparatus; and using the information to associate the first wireless communication apparatus with one or more second wireless communication apparatuses, wherein the one or more second wireless communication apparatuses are determined based at least in part on the information relating to the second communication network, wherein the information relating to the second communication network includes:

identification information about the one or more second wireless communication apparatuses discovered by the first wireless communication apparatus using the second communication network, and power information about received power of the one or more second wireless communication apparatuses, and wherein the control circuitry is configured to define a group candidate as a group based on the information.

* * * * *